United States Patent
Otani et al.

(10) Patent No.: US 9,448,390 B2
(45) Date of Patent: Sep. 20, 2016

(54) PROJECTION OPTICAL SYSTEM AND PROJECTOR HAVING THE SAME

(71) Applicant: SEIKO EPSON CORPORATION, Tokyo (JP)

(72) Inventors: Makoto Otani, Matsumoto (JP); Eiji Morikuni, Shiorjiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 509 days.

(21) Appl. No.: 13/659,276

(22) Filed: Oct. 24, 2012

(65) Prior Publication Data

US 2013/0107229 A1 May 2, 2013

(30) Foreign Application Priority Data

Oct. 27, 2011 (JP) ................................. 2011-235728

(51) Int. Cl.
*G02B 13/12* (2006.01)
*G03B 21/14* (2006.01)
*G02B 13/08* (2006.01)

(52) U.S. Cl.
CPC .............. *G02B 13/12* (2013.01); *G03B 21/142* (2013.01); *G03B 21/147* (2013.01); *G02B 13/08* (2013.01); *G03B 2205/0092* (2013.01)

(58) Field of Classification Search
CPC .............. G03B 2205/0007; G03B 2205/0015; G03B 2205/0038; G03B 2205/0046; G03B 2205/0053; G03B 2205/0092; G03B 21/142; G02B 13/12; G02B 13/16; G02B 13/08; G02B 13/22
USPC .............. 353/79, 100, 101, 69, 70, 121, 122; 349/5; 359/642, 644–647, 649–651, 359/668–679; 348/747
See application file for complete search history.

(56) References Cited

U.S. PATENT DOCUMENTS

| | | | |
|---|---|---|---|
| 6,181,482 B1 * | 1/2001 | Grafton | 359/670 |
| 6,592,228 B1 * | 7/2003 | Kawashima | G03B 21/00 348/745 |
| 7,113,344 B2 | 9/2006 | Nurishi et al. | |
| 7,993,013 B2 * | 8/2011 | Furui | 353/70 |
| 2007/0077047 A1 * | 4/2007 | Nomura | G03B 17/00 396/55 |
| 2007/0081257 A1 * | 4/2007 | Bowron et al. | 359/668 |
| 2008/0297668 A1 | 12/2008 | Sawai | |
| 2010/0165297 A1 * | 7/2010 | Mizushima et al. | 353/30 |
| 2010/0208149 A1 * | 8/2010 | Morikuni | 348/744 |

(Continued)

FOREIGN PATENT DOCUMENTS

| | | |
|---|---|---|
| CN | 102841434 A | 12/2012 |
| JP | 2002-258154 A | 9/2002 |
| JP | A-2005-221597 | 8/2005 |
| JP | 2006005534 A * | 1/2006 |

(Continued)

*Primary Examiner* — Bao-Luan Le
*Assistant Examiner* — Christopher Lamb, II
(74) *Attorney, Agent, or Firm* — Oliff PLC

(57) ABSTRACT

A second group has different power in the vertical direction and the horizontal direction of the liquid crystal panel. Therefore, the horizontal-to-vertical ratio of the image of the liquid crystal panel and the horizontal-to-vertical ratio of the image projected on the screen can be set to be different. That is, the projection optical system is able to convert the aspect ratio which is a ratio of width and height. At this time, at the time of converting the aspect ratio, that is, at the time of switching the projection state, it is possible to adjust the position of the image on the screen through a zoom operation or a shift operation of the first driving mechanism or the fourth driving mechanism.

18 Claims, 14 Drawing Sheets

(56) References Cited

U.S. PATENT DOCUMENTS

2011/0157487 A1* 6/2011 Akeyama ............... 348/759
2012/0147338 A1* 6/2012 Huang .................... 353/81
2012/0327372 A1  12/2012 Otani et al.

FOREIGN PATENT DOCUMENTS

| JP | 2008-298853 A | 12/2008 |
| JP | 2011-145583 A | 7/2011 |
| WO | WO 2010023868 A1 * | 3/2010 |

* cited by examiner

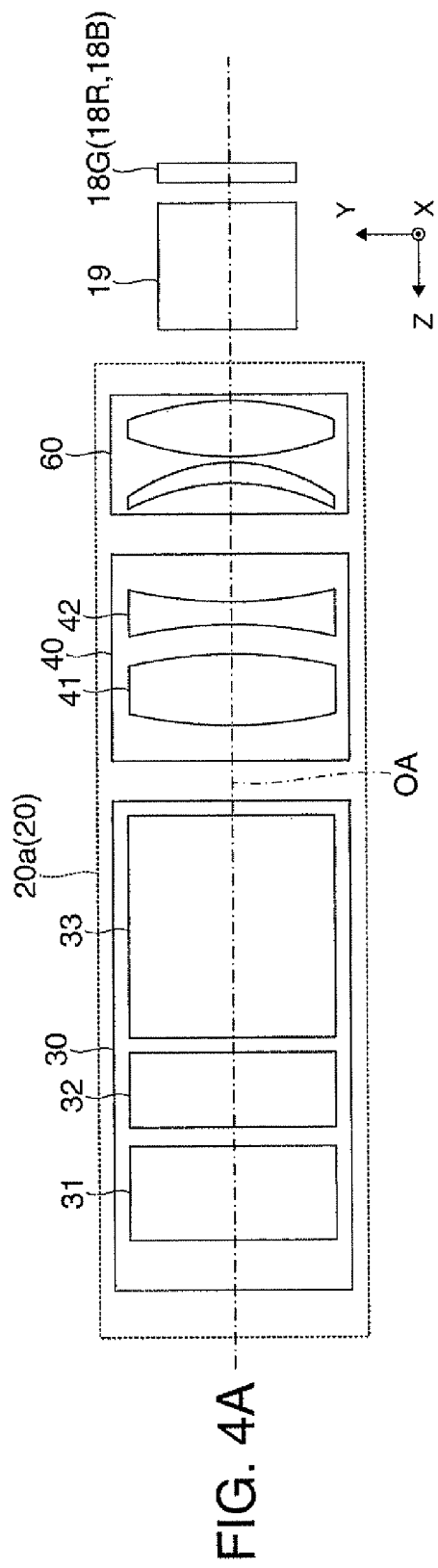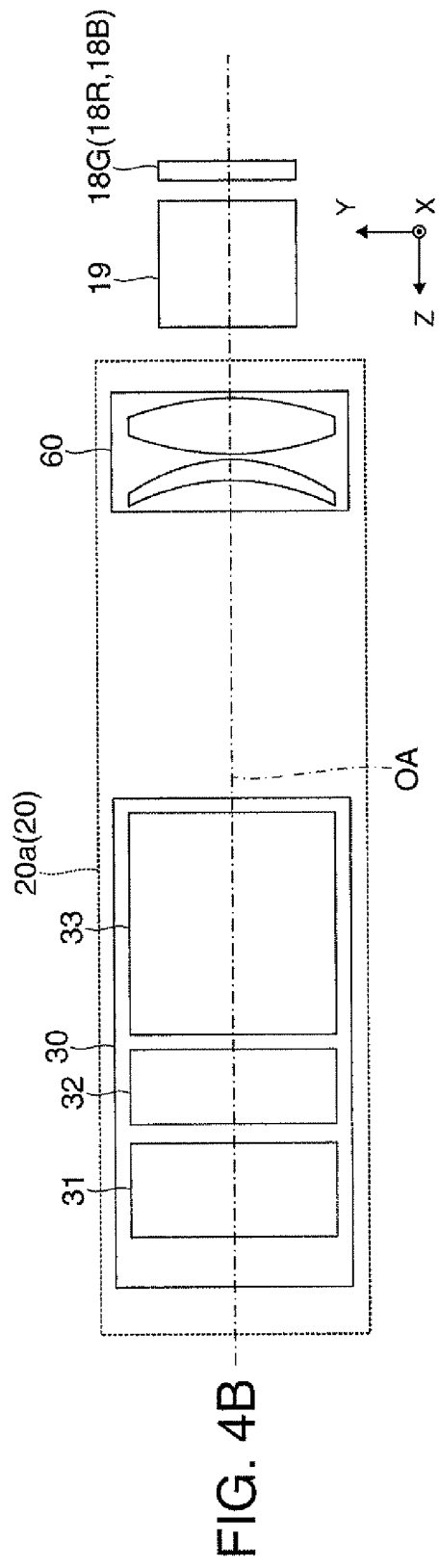

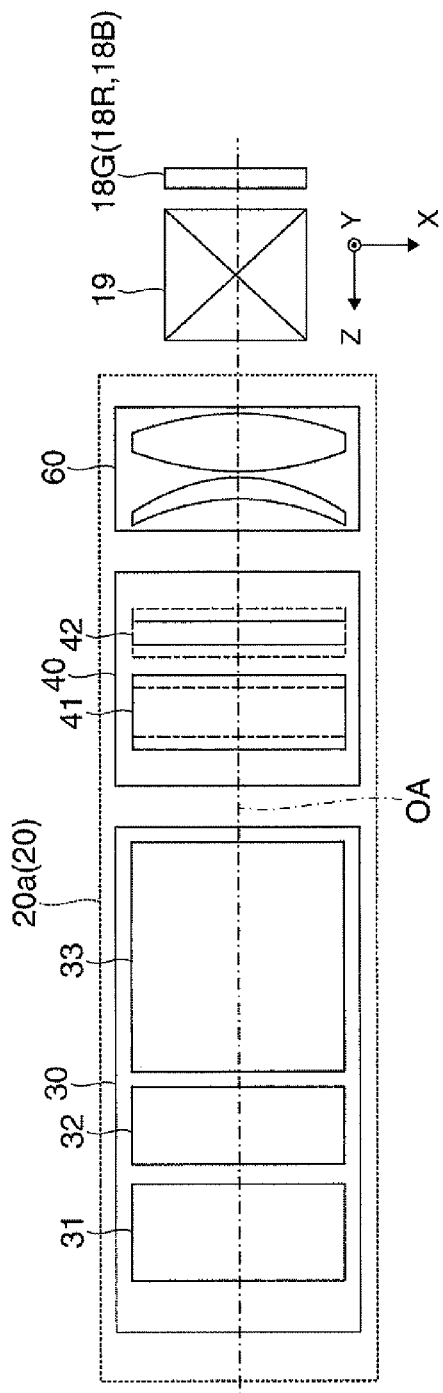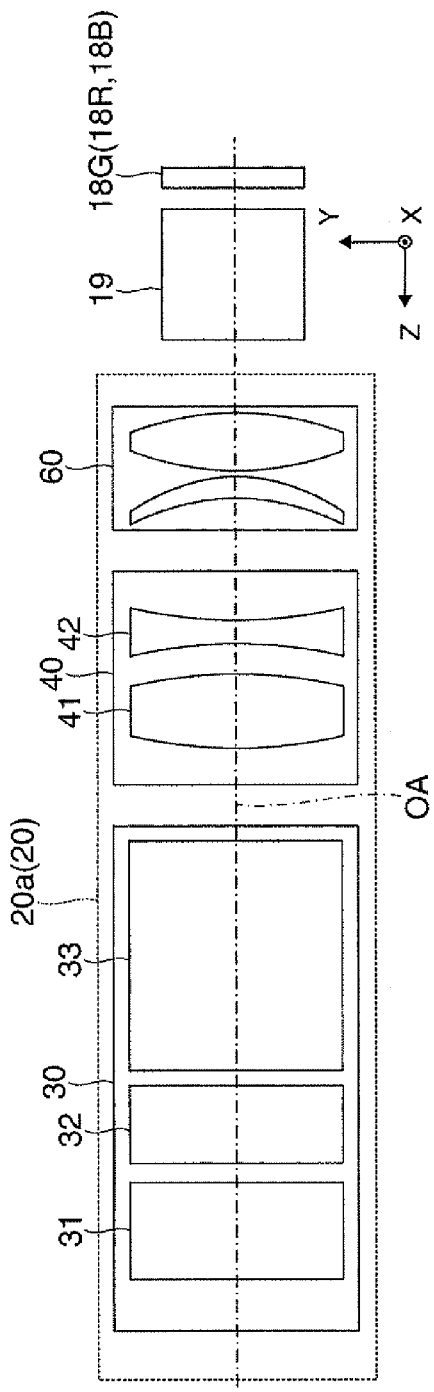

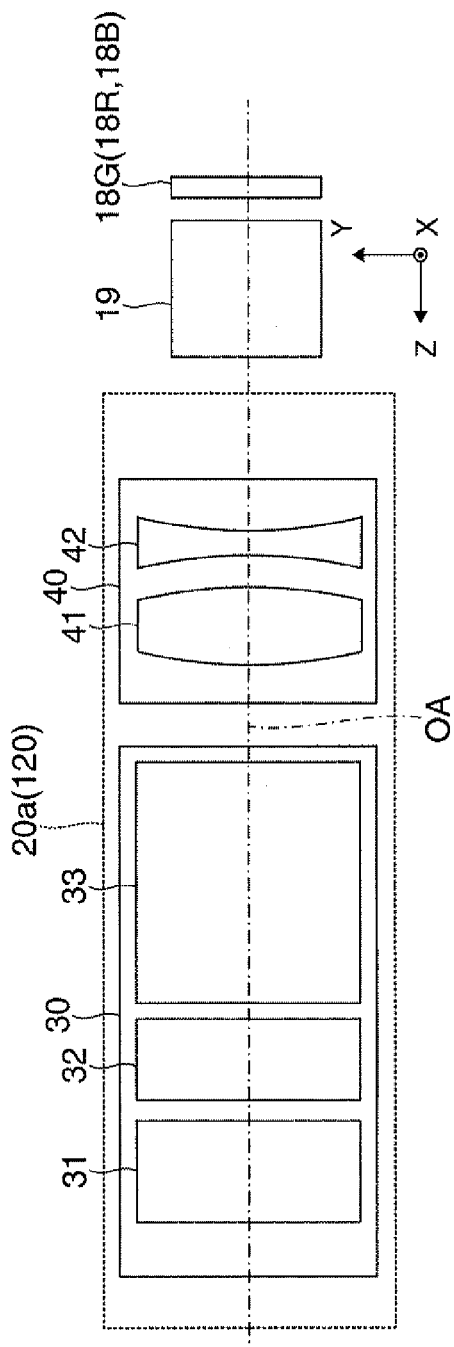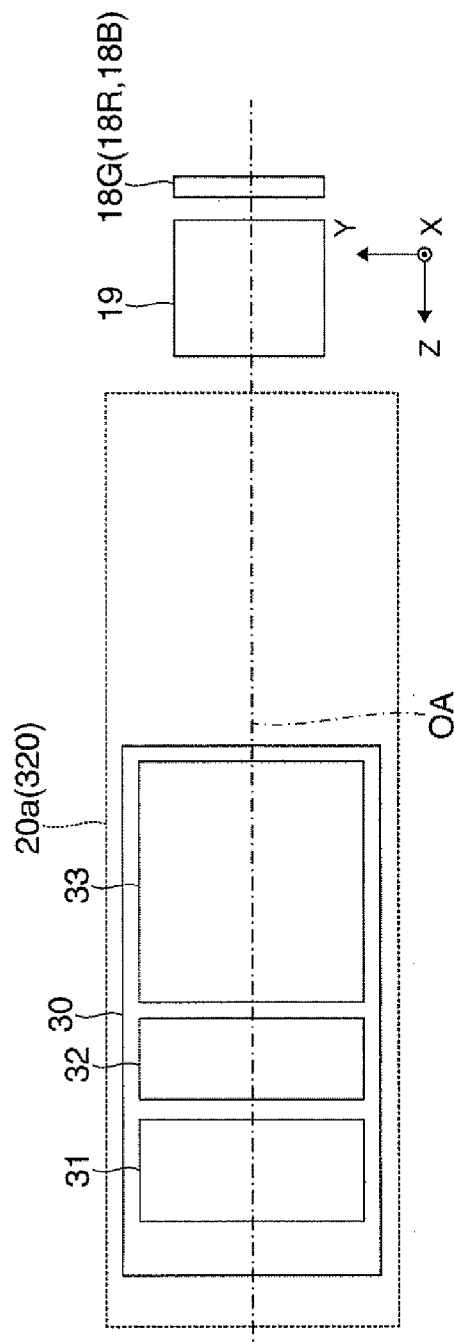

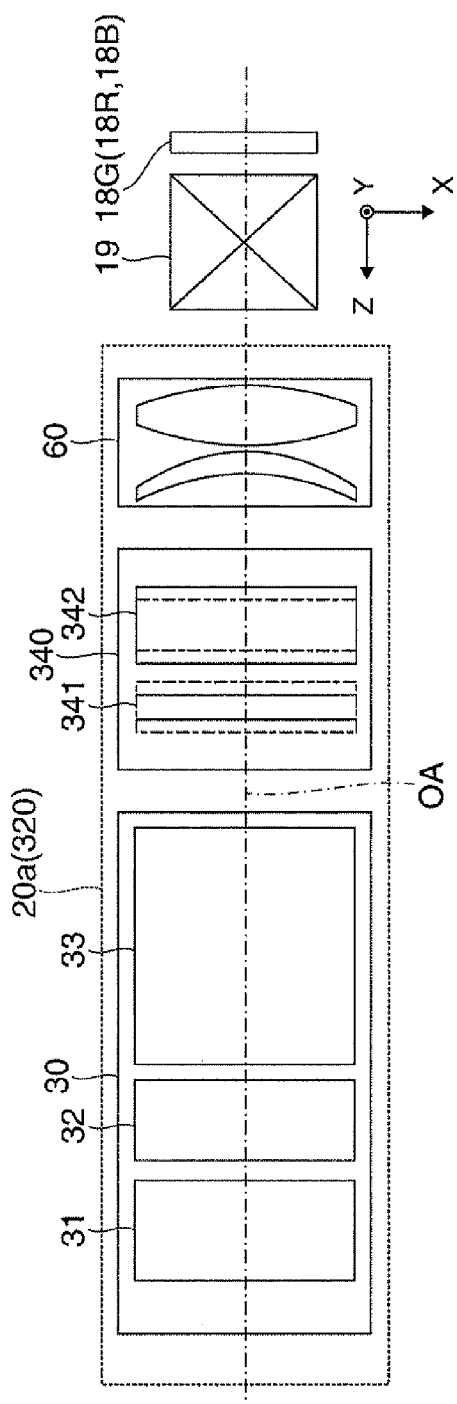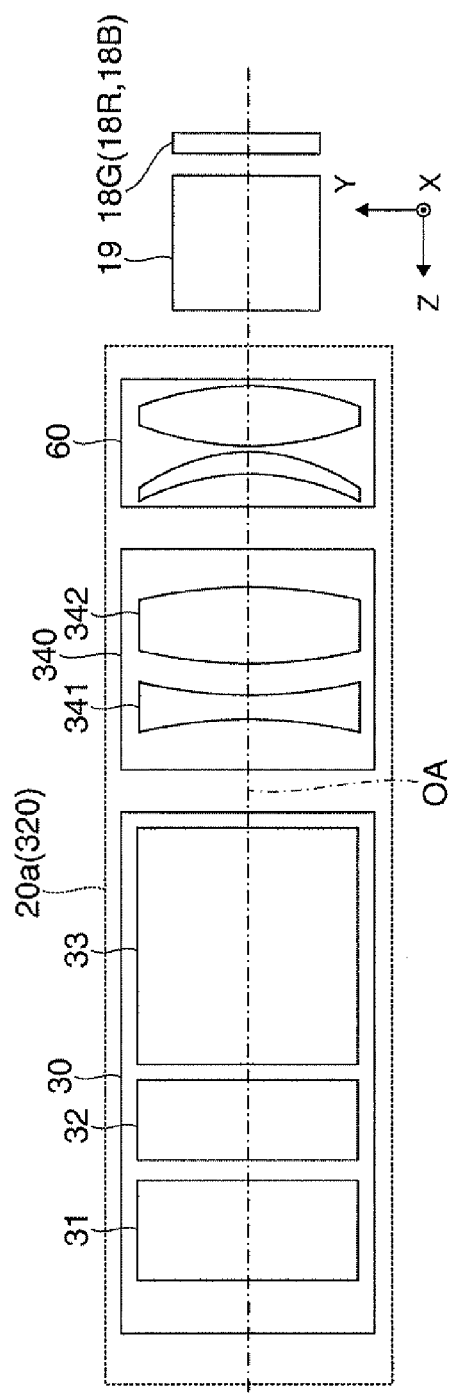

PROJECTION OPTICAL SYSTEM AND PROJECTOR HAVING THE SAME

BACKGROUND

1. Technical Field

The present invention relates to a projection optical system, which is capable of converting the aspect ratio of a projection image, and a projector having the same.

2. Related Art

There are front-type converters that are converters for aspect ratio conversion used in projection optical systems of projectors and are disposed to be able to advance and retract relative to the original positions on the front face, that is, the image-side front of the projection optical systems.

However, some of the projectors may perform, for example, tilt projection to project an image in a state where the center of the image element is out of the optical axis of the projection optical system. In such image projection, the deviation between the optical axis and the center of the image element may cause change in the center position of the screen image on the screen which is the projection target surface in accordance with conversion of the aspect ratio. That is, by converting the aspect ratio, the positional relationship between the center of the screen and the optical axis is changed. As a result, the change may cause a situation in which the entire projection image is also projected at a position deviated from the center of the screen.

In addition, there are rear-type relay systems that are converters for aspect ratio conversion that are not used in the projection optical systems of the projectors but in image capturing optical systems such as cameras and are detachably disposed on the image sides of the imaging optical systems (refer to JP-A-2005-221597).

However, in the image capturing optical system disclosed in JP-A-2005-221597 or the like, it is not normally assumed to adopt an aspect in which the center of the image element is deviated from the optical axis of the projection optical system in a similar manner to the tilt projection. Accordingly, although a configuration in which the relay system is disposed on the rear side in a similar manner to JP-A-2005-221597 is used in the projection optical system of the projector, there is a problem of the positional deviation of the projection image caused by the conversion of the aspect ratio similarly thereto.

SUMMARY

An advantage of some aspects of the invention is to provide a projection optical system, which is capable of converting the aspect ratio and adjusting the positional deviation of the projection image caused by the conversion of the aspect ratio, and a projector having the same.

An aspect of the invention is directed to a projection optical system in which a horizontal-to-vertical ratio of an image of a light modulation element is set to be different from a horizontal-to-vertical ratio of an image projected onto a projection target surface at the time of projecting the image onto the projection target surface in an enlarged manner; the projection optical system including: (a) a first group that is disposed on an optical path; (b) a second group that includes an anamorphic optical system which has different power in a vertical direction and a horizontal direction of the light modulation element and is able to advance and retract along the optical path; and (c) a driving section that has at least one of a shift driving mechanism, which shifts the first group and the second group in a direction perpendicular to an optical axis direction, and a zoom driving mechanism, which drives the first group in the optical axis direction, so as to reduce deviation in a projection position caused by the advance and retreat of the second group. Note that, in the case where the first group is not a zoom optical system but a fixed optical system, the zoom driving mechanism is removed, and the first group is formed of only the shift driving mechanism.

According to the projection optical system, the second group is able to advance and retract in the optical path, and in the first operation state where the second group converts the horizontal-to-vertical ratio in the optical path to perform projection, the second group has different focal lengths in the vertical and horizontal directions and has different enlargement magnifications in the vertical and horizontal directions. Thus, the horizontal-to-vertical ratio of the image of the light modulation element and the horizontal-to-vertical ratio of the image projected on the projection target surface can be set to be different. That is, the projection optical system is able to convert the horizontal-to-vertical ratio, that is, the aspect ratio which is a ratio of width and height. Further, in the second operation state where the second group is retracted from the optical path to perform projection without converting the horizontal-to-vertical ratio, for example, the horizontal-to-vertical ratio of the image of the light modulation element can be set to be equal to the horizontal-to-vertical ratio of the image projected on the projection target surface. That is, the projection optical system is able to keep the ratio of width and height constant as it is without converting the ratio of width and height. At the time of switching the above-mentioned projection state, the driving section has at least either one of the shift driving mechanism and the zoom driving mechanism, and performs adjustments so as to reduce the deviation in the projection position through at least either one of the shift operation and the zoom operation, whereby it is possible to reduce the positional deviation of the image on the projection target surface. That is, the projection optical system is configured to be able to convert the aspect ratio (horizontal-to-vertical ratio) and to adjust the positional deviation of the projection image caused by the conversion of the aspect ratio.

In a specific aspect of the invention, the driving section has at least the shift driving mechanism, and shifts the first group and the second group in accordance with the advance and retreat of the second group. In this case, by adjusting the projection position in the first operation state where the second group is inserted in the optical path, the shift driving mechanism is able to reduce the deviation between the above projection position and the projection position in the second operation state where the second group is retracted from the optical path.

In another specific aspect of the invention, the driving section performs adjustments such that a center position of a projection image in a state where the second group is retracted from the optical path coincides with a center position of a projection image in a state where the second group is inserted in the optical path. In this case, in both of the first operation state where the second group is inserted in the optical path and the second operation state where the second group is retracted from the optical path, it is possible to fix the center position of the projection image on the projection target surface.

In still another specific aspect of the invention, the driving section has both of the shift driving mechanism and the zoom driving mechanism, adjusts a magnification percentage of the image on the projection target surface through an operation of the zoom driving mechanism, and adjusts the position of the image on the projection target surface through an operation of the shift driving mechanism. In this case, first, after the projection image is enlarged or reduced with a predetermined projection magnification so as to have a predetermined size by the zoom driving mechanism, the shift driving mechanism is able to adjust the position of the size-adjusted projection image on the projection target surface by a correction amount to which the predetermined projection magnification is applied.

In yet another specific aspect of the invention, in the state where the second group is retracted from the optical path, when a center position of the light modulation element is shifted by a predetermined amount of deviation from an optical axis of the first group, assuming that the amounts of deviation from the center position of the light modulation element with respect to the optical axis of the first group in a first direction perpendicular to the optical axis of the first group and a second direction perpendicular to the optical axis of the first group and the first direction are respectively X and Y, focal lengths in the first direction and the second direction are $f_x$ and $f_y$, and in the state where the second group is inserted in the optical path, assuming that focal lengths in the first direction and the second direction are $f'_x$ and $f'_y$, a magnification of the zoom performed by the zoom driving mechanism is P, and the amounts of shift performed by the shift driving mechanism are respectively X' and Y', the following expressions are established.

$$X' = \frac{X \cdot f'_x}{P \cdot f_x}, Y' = \frac{Y \cdot f'_y}{P \cdot f_y}$$

In this case, by causing the shift driving mechanism to respectively shift the second group by the amounts of shift X' and Y' relative to the amounts of deviation X and Y in the first direction and the second direction, the center position of the projection image can be set at the same position in the first operation state and the second operation state.

In still yet another specific aspect of the invention, the projection optical system further includes a dimension fixation control section that keeps either one of the dimensions of the image projected onto the projection target surface in the first direction and the second direction around the time of conversion of the horizontal-to-vertical ratio of the image caused by the advance/retreat operation of the second group. In this case, for example, the projection target surface, of which the horizontal dimension or the vertical dimension is fixed, can be used.

In further another specific aspect of the invention, the second group is formed of, in order from the projection target surface side, a first optical element group with a positive power and a second optical element group with a negative power, in a cross-section of the light modulation element in the vertical direction. In this case, it is possible to shrink or shorten the projection image, which is projected on the projection target surface, in the vertical direction.

In still further another specific aspect of the invention, the second group is formed of, in order from the projection target surface side, a first optical element group with a negative power and a second optical element group with a positive power, in a cross-section of the light modulation element in the horizontal direction. In this case, it is possible to enlarge or extend the projection image, which is projected on the projection target surface, in the horizontal direction.

In yet further another specific aspect of the invention, the first group is practically formed of lens groups which are rotationally symmetric. In this case, in the second operation state where the second group is retracted from the optical path, it is possible to form the projection image which has an aspect ratio equal to that of the light modulation element.

Another aspect of the invention is directed to a projector including: the above-mentioned projection optical system; and the light modulation element. According to the projector, it is possible to project an image, which has a horizontal-to-vertical ratio different from the aspect ratio of the image of the light modulation element, onto the projection target surface. At this time, it is possible to adjust the positional deviation of the projection image caused by the conversion of the aspect ratio.

BRIEF DESCRIPTION OF THE DRAWINGS

The invention will be described with reference to the accompanying drawings, wherein like numbers reference like elements.

FIG. 4A is a diagram illustrating a configuration of a vertical cross-section of the projection optical system in the first operation state, and FIG. 4B is a diagram illustrating a configuration of a vertical cross-section of the projection optical system in the second operation state.

FIG. 9A is a diagram illustrating a configuration of a horizontal cross-section of an example of the projection optical system of the projector according to the first embodiment in the first operation state, and FIG. 9B is a diagram illustrating a configuration of a vertical cross-section of the projection optical system in the first operation state.

FIG. 12A is a diagram illustrating a first operation state of a projection optical system of a projector according to a third embodiment, and FIG. 12B is a diagram illustrating a second operation state of the projection optical system.

FIG. 14A is a diagram illustrating a configuration of a horizontal cross-section of another example of the projection optical system of the projector in the first operation state, and FIG. 14B is a diagram illustrating a configuration of a vertical cross-section of the projection optical system in the first operation state.

DESCRIPTION OF EXEMPLARY EMBODIMENTS

Figure 1:
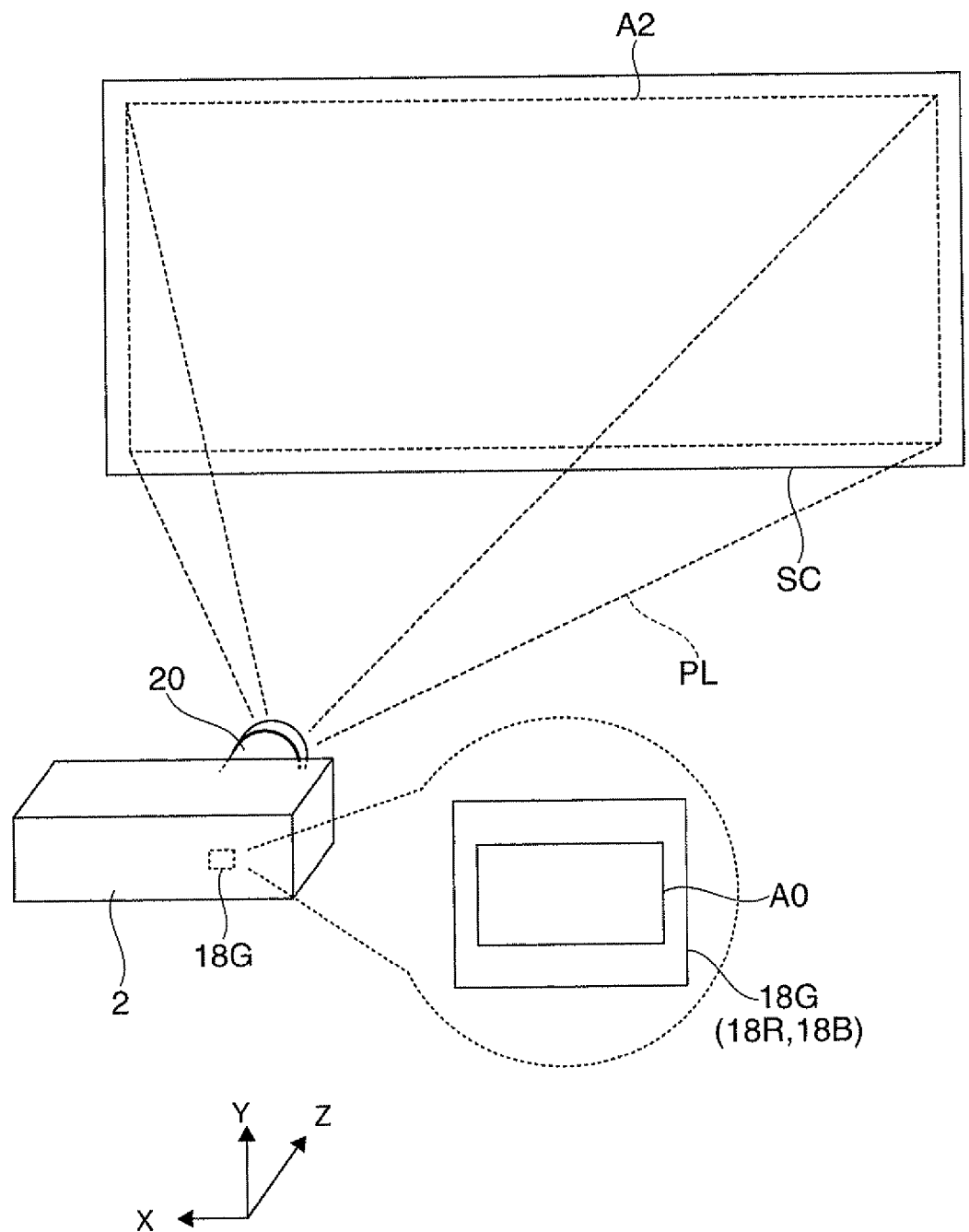
FIG. 1 is a perspective view illustrating a situation in which a projector according to a first embodiment is used.

Hereinafter, referring to the accompanying drawings, a projector and a projection optical system according to an embodiment of the invention will be described in detail.
First Embodiment As shown in FIG. 1, a projector 2 according to a first embodiment of the invention generates image light PL in response to an image signal, and projects the corresponding image light PL onto the projection target surface such as a screen SC. When an image of a liquid crystal panel 18G (18R, 18B) which is a light modulation element built into the projector 2 is projected onto the screen (projection target surface) SC in an enlarged manner, the projection optical system 20 of the projector 2 is able to set the horizontal-to-vertical ratio (aspect ratio) AR2 of the image projected on the screen SC such that it is different from the horizontal-to-vertical ratio (aspect ratio) AR0 of the image of the liquid crystal panel 18G (18R, 18B). That is, the horizontal-to-vertical ratio AR0 of the display area A0 of the liquid crystal panel 18G and the horizontal-to-vertical ratio AR2 of the display area A2 of the screen SC as an area of the projection image can be set to be different from each other, but can also be set to be the same. Specifically, the horizontal-to-vertical ratio AR0 of the display area A0 of the liquid crystal panel 18G is set to, for example, 1.78:1, the horizontal-to-vertical ratio AR2 of the display area A2 of screen SC is set to, for example, 1.78:1, 1.85:1, 2.35:1, 2.4:1, or the like.

Figure 2:
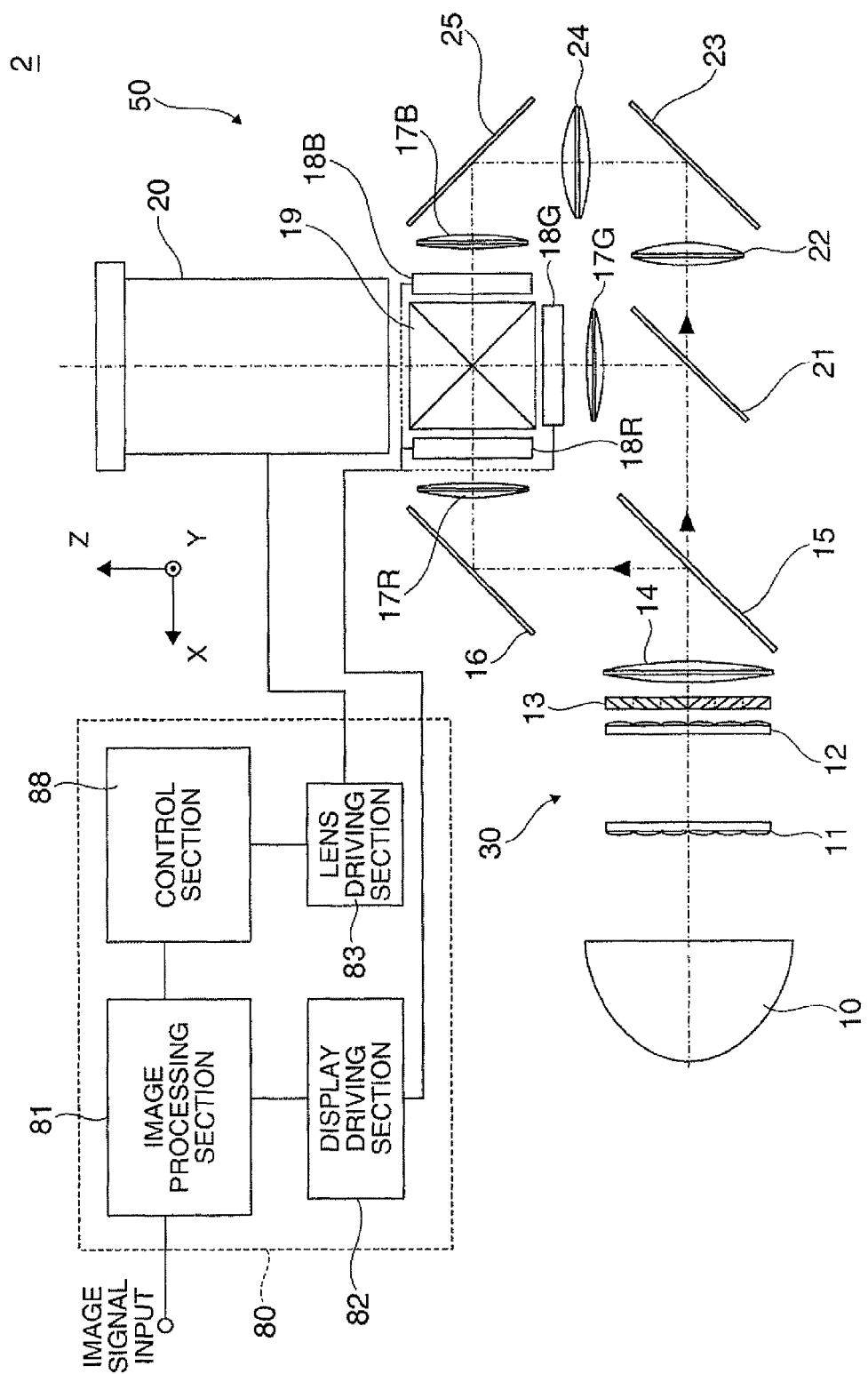
FIG. 2 is a diagram illustrating a schematic configuration of the projector of FIG. 1.

As shown in FIG. 2, the projector 2 includes: an optical system part 50 that projects image light; and a circuit device 80 that controls an operation of the optical system part 50.

In the optical system part 50, a light source 10 is, for example, an ultra-high pressure mercury lamp, and emits light including R light, G light, and B light. Here, the light source 10 may be a discharge light source other than the ultra-high pressure mercury lamp, and may be a solid light source such as an LED or a laser. The first integrator lens 11 and the second integrator lens 12 have a plurality of lens elements formed in an array shape. The first integrator lens 11 splits a ray emitted from the light source 10 into a plurality of rays. The lens elements of the first integrator lens 11 concentrate the rays emitted from the light source 10 near the lens elements of the second integrator lens 12. The lens elements of the second integrator lens 12 form, in cooperation with a superimposing lens 14, images of the lens elements of the first integrator lens 11 on the liquid crystal panels 18R, 18G, and 18B. With such a configuration, the light emitted from the light source 10 illuminates the entire display area (the display area A0 of FIG. 1) of the liquid crystal panels 18R, 18G, and 18B at a substantially uniform luminance.

A polarization conversion element 13 converts the light emitted from the second integrator lens 12 into predetermined linearly polarized light. The superimposing lens 14 superimposes the images of the lens elements of the first integrator lens 11 on the display area of the liquid crystal panels 18R, 18G, and 18B through the second integrator lens 12.

A first dichroic mirror 15 reflects the R light, which is incident from the superimposing lens 14, and transmits the G light and the B light. The R light, which is reflected by the first dichroic mirror 15, travels via a reflection mirror 16 and a field lens 17R, and is incident on the liquid crystal panel 18R which is a light modulation element. The liquid crystal panel 18R modulates the R light in response to the image signal, thereby forming an R-color image.

A second dichroic mirror 21 reflects the G light emitted from the first dichroic mirror 15, and transmits the B light. The G light, which is reflected by the second dichroic mirror 21, travels via a field lens 17G, and is incident on the liquid crystal panel 18G which is a light modulation element. The liquid crystal panel 18G modulates the G light in response to the image signal, thereby forming a G-color image. The B light, which is transmitted through the second dichroic mirror 21, travels via relay lenses 22 and 24, reflection mirrors 23 and 25, and a field lens 172, and is incident on the liquid crystal panel 182 which is a light modulation element. The liquid crystal panel 18B modulates the B light in response to the image signal, thereby forming a B-color image.

A cross dichroic prism 19 is a prism for light synthesis, and synthesizes rays respectively modulated by the liquid crystal panels 18R, 18G, and 18B into image light, and emits the light to the projection optical system 20.

The projection optical system 20 projects the image light PL, which is modulated by the liquid crystal panels 18R, 18G, and 18B and is synthesized by the cross dichroic prism 19, onto the screen SC of FIG. 1 in an enlarged manner. At this time, the projection optical system 20 sets the horizontal-to-vertical ratio AR2 of the image, which is projected onto the screen SC, such that it is different from the horizontal-to-vertical ratio AR0 of the images of the liquid crystal panels 18R, 18G, and 18B or it is the same as the horizontal-to-vertical ratio AR0.

The circuit device 80 includes: an image processing section 81 to which an external image signal such as a video signal is input; a display driving section 82 that drives the liquid crystal panels 18R, 18G, and 18B provided in the optical system part 50 on the basis of the output of the image processing section 81; a lens driving section 83 that adjusts the status of the projection optical system 20 by operating a driving mechanism (not shown in the drawing) provided in the projection optical system 20; and a main control section 88 that integrally controls operations of the circuit portions 81, 82, and 83.

The image processing section 81 converts the input external image signal into an image signal which contains the gray levels of the respective colors and the like. In the case of the first operation state where the projection optical system 20 converts the vertical-to-horizontal ratio or the horizontal-to-vertical ratio (aspect ratio) of the image and performs projection, the image processing section 81 converts the aspect ratio of the image in advance in a reverse manner to the conversion of the horizontal-to-vertical ratio performed by the projection optical system 20 so as not to vertically and horizontally expand or squeeze the image which is displayed on the screen SC. Specifically, when the image is horizontally expanded by the projection optical system 20 such that the aspect ratio thereof is changed from, for example, 1.78:1 to, for example, 2.4:1, preliminarily, the image is horizontally squeezed by 0.742=1.78/2.4 times the original, or the image is vertically expanded by 1.35=2.4/1.78 times the original. In contrast, in the case of the second operation state where the projection optical system 20 performs projection without converting the horizontal-to-vertical ratio or the aspect ratio of the image, the image processing section 81 does not convert the aspect ratio of the image. Note that, the image processing section 81 may perform various kinds of image processing such as distortion correction and color correction on the external image signal.

The display driving section 82 is able to operate the liquid crystal panels 18R, 18G, and 18E on the basis of the image signal which is output from the image processing section 81, and is thus able to form an image corresponding to the image signal or an image corresponding to the image signal subjected to the image processing on the liquid crystal panels 18R, 18G, and 18B.

The lens driving section 83 is operated under control of the main control section 88 so as to move, for example, some optical elements, which constitute projection optical system 20 and include a diaphragm, along the optical axis OA. Thereby, the projection optical system 20 is able to change the projection magnification of the image on the screen SC of FIG. 1. Further, the lens driving section 83 advances or retracts some separate optical elements constituting the projection optical system 20 in the optical axis OA, that is, in the optical path. Thereby, it is possible to change the horizontal-to-vertical ratio AR2 of the image projected on the screen SC of FIG. 1. The lens driving section 83 is able to change the vertical position of the image projected on the screen SC of FIG. 1 through tilt adjustment to move the entire projection optical system 20 in the up and down directions perpendicular to the optical axis OA.

Hereinafter, referring to FIGS. 3A to 3C, 4A, and 4B and the like, the projection optical system 20 of the embodiment will be described. The projection optical system 20 includes: a main body part 20a that is formed of a plurality of optical elements such as lenses; and a driving section 65 that adjusts the imaging condition by moving a part or all of the main body part 20a. The driving section 65 includes first, second, third and fourth driving mechanisms 61, 62, 63, and 64.

Figure 3A:
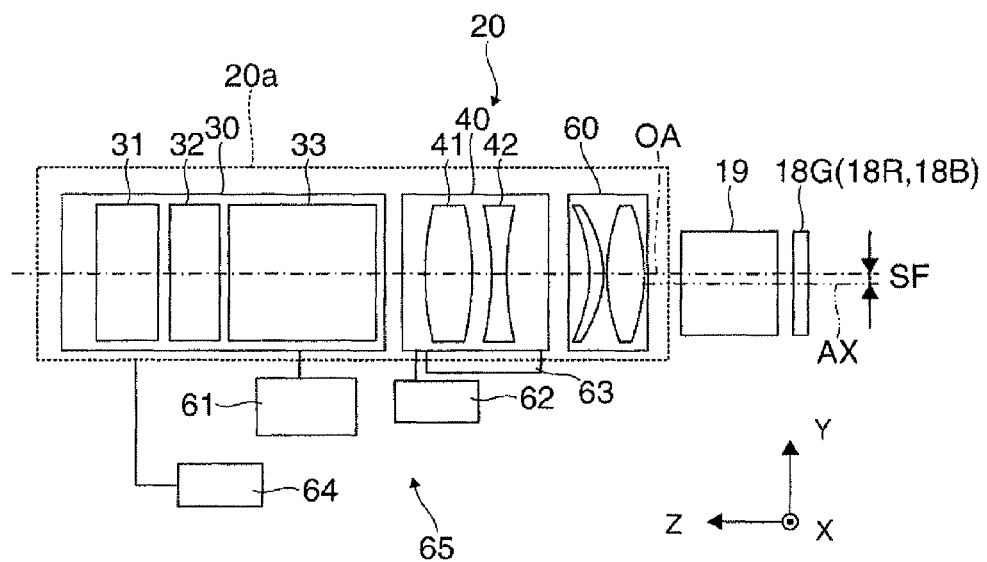
FIG. 3A is a diagram illustrating a structure of a projection optical system in the projector of FIG. 1.
Figures 3B, 3C:
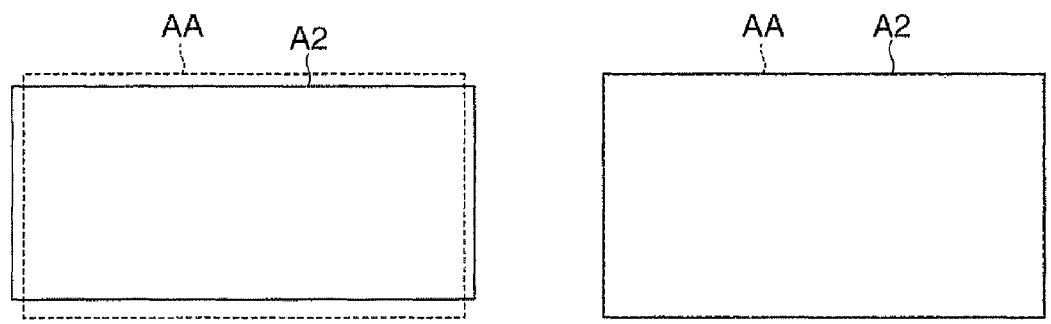
FIG. 3B is a diagram illustrating a display area on a projection target surface in a first operation state.
FIG. 3C is a diagram illustrating a display area on the projection target surface in a second operation state.
Figure 5A:
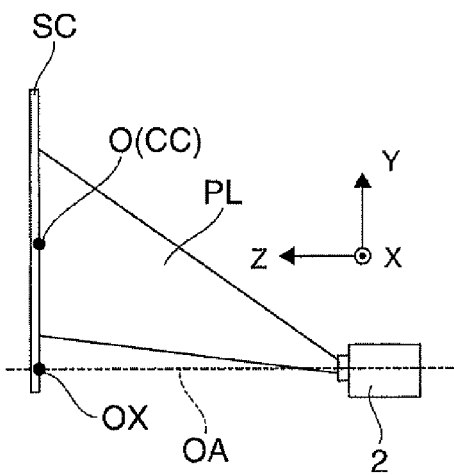
FIG. 5A is a diagram illustrating a situation of projection in the second operation state.
Figure 5C:
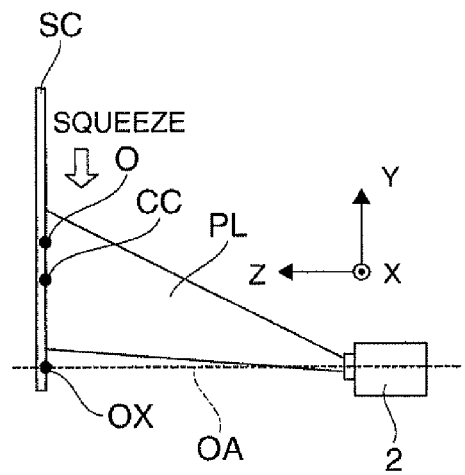
FIG. 5C is a diagram illustrating a situation of projection in the first operation state.
Figure 5B:
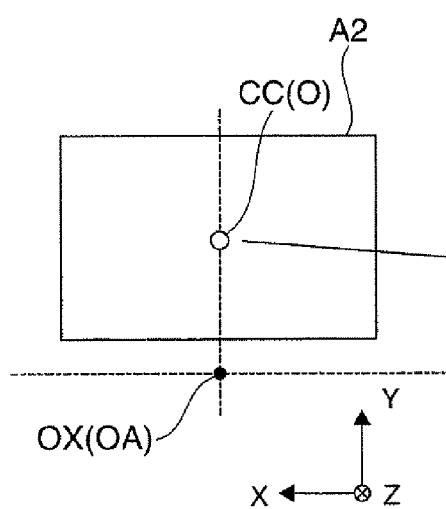
FIG. 5B is a diagram illustrating a situation of a projection image in the second operation state.
Figure 5D:
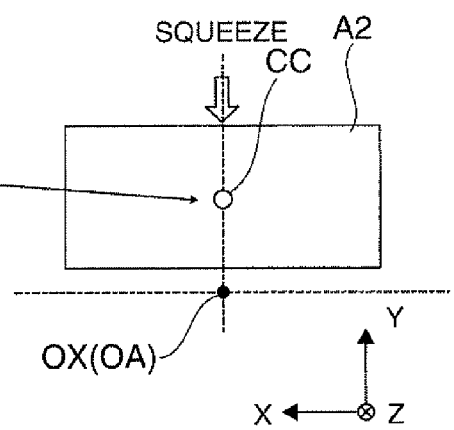
FIG. 5D is a diagram illustrating a situation of a projection image in the first operation state.

The main body part 20a is practically formed of, in order from the screen SC side, a first group 30, a second group 40, and a third group 60. Here, the term "practically formed of" means that the projection optical system 20 may include not only the first group 30, the second group 40, and the third group 60 but also a lens which has no power in practice. In the first, second, third and fourth driving mechanisms 61, 62, 63, and 64 constituting the driving section 65, the first driving mechanism 61 moves the first group 30, the second and third driving mechanisms 62 and 63 move the second group 40, and the fourth driving mechanism 64 integrally moves the entire projection optical system 20. In addition, the second group 40 can be advanced or retracted in the optical path of the optical axis OA by the second driving mechanism 62, and FIG. 3A shows a situation in which the second group 40 is inserted in the optical path. Further, FIGS. 3B and 3C show display areas A2 which is areas of the projection image on the screen SC (refer to FIG. 1) in the first operation state where the second group 40 is inserted and the second operation state where the second group 40 is retracted.

The first group 30 has a first lens section 31, a second lens section 32, and a third lens section 33. The first group 30 minutely moves, for example, at least a single lens constituting the first lens section 31 along the optical axis OA through a manual operation or the like. Thereby, it is possible to adjust the focus status of the main body part 20a. That is, the first lens section 31 functions as a focus optical system that performs a focus operation. Further, the second lens section 32 is a fixed lens. Furthermore, the third lens section 33 is formed of at least a single lens, and is able to adjust the projection magnification determined by the main body part 20a in a certain range. That is, the third lens section 33 functions as a zoom optical system that is driven by the driving mechanism 61 to perform a zoom operation. Conversely, the first driving mechanism 61 is a zoom driving mechanism for performing the zoom operation of the third lens section 33 which is the zoom optical system in the first group 30.

The second group 40 is an adjustment optical element which has different focal lengths in the horizontal direction (X direction) and the vertical direction (Y direction). As a result, even the whole system of the projection optical system 20, which also includes the first group 30 and the third group 60, has different focal lengths in the vertical direction and the horizontal direction. That is, since the second group 40 is present in the optical path, the enlargement magnifications determined by the main body part 20a in the vertical direction and the horizontal direction are set to be different. Thereby, it is possible to project an image, which has the horizontal-to-vertical ratio AR2 different from the horizontal-to-vertical ratio AR0 of the image displayed on the liquid crystal panel 18G (18R, 18B), onto the screen SC. The second group 40 includes at least one adjustment optical element which is rotationally asymmetric with respect to the optical axis OA. Specifically, the second group 40 includes, for example in order from the screen SC side, a first optical element group 41 with a positive power and a second optical element group 42 with a negative power in a cross-section in the vertical direction (Y direction) shown in FIG. 4A. Thereby, the second group 40 is configured to exhibit an effect of squeeze in the vertical direction (Y direction).

In addition, regarding the horizontal direction (X direction) of the second group 40, various forms are used in accordance with the squeezing rate in the vertical direction and the conversion proportion of the necessary aspect ratio. Thus, for example, as an example will be described later with reference to FIG. 9A and the like, the second group 40 may be configured to have no power, and may exhibit an effect of expansion contrary to the case of the vertical direction.

As described above, by combining the second group 40 as an anamorphic optical system with an optical element group with a different refractive power, the second group can be made to function as an afocal system. As a result, it is possible to easily perform power variation, that is, zooming.

Furthermore, the second group 40 can be integrally advanced or retracted in the optical axis OA, that is, in the optical path by the second driving mechanism 62 which is a first anamorphic driving mechanism as a mechanism for driving the advance and retreat. Thereby, the projection optical system 20 is able to change the horizontal-to-vertical ratio of the image. The change of the image will be described in detail later.

The third group 60 includes at least one rotationally-symmetric lens which is a rotationally-symmetric optical element having power in the horizontal direction and the vertical direction. The third group 60 has a positive power, and thus it is possible to suppress the spread of light emitted from the light modulation element. Hence, it is possible to suppress the angle of the light which is incident on the second group 40, and thus it is possible to suppress aberration caused by the second group 40. As a result, the third group 60 has a function of suppressing aberration of the whole projection optical system 20. Thus, the third group 60 has a plurality of lenses as correction optical elements, some lenses thereof have positive power, and the lenses include aspheric lenses as necessary.

The first group 30 and the third group 60 remain stationary in the optical path, but the second group 40 is integrally advanced or retracted in the optical path by the first anamorphic driving mechanism 62 as described above. Thereby, it is possible to change the horizontal-to-vertical ratio (aspect ratio) of the image projected on the screen SC at a desired timing.

Specifically, as shown in FIG. 4A, in the case of achieving the first operation state where the second group 40 is disposed in the optical path, it is possible to project an image on the screen SC with the horizontal-to-vertical ratio (for example 2.4:1) by which the image formed on the liquid crystal panel 18G (18R, 18B) is squeezed in the vertical direction. Alternatively, as shown in FIG. 4B, in the case of achieving the second operation state where the second group 40 is retracted from the optical path, it is possible to project an image on the screen SC with the horizontal-to-vertical ratio (for example 1.78:1) as it is the image formed on the liquid crystal panel 18G (18R, 18B). In this case, as shown in FIG. 3C, it is assumed that the display area A2 in the case of the second operation state where the second group 40 is not provided is a former display area AA. As shown in FIG. 3B, in the first operation state where the second group 40 is inserted, the former display area AA is vertically squeezed, thereby forming the display area A2 which is enlarged in the horizontal direction and is wider than the display area AA in the horizontal direction.

As shown in FIG. 4B, in the case of achieving the second operation state by retracting the second group 40 of the projection optical system 20 out of the optical path, nothing is disposed at the position of the second group 40 in the projection optical system 20. That is, when the second group 40 is retracted, the projection optical system 20 is formed of the first group 30 and the third group 60 which include only optical elements that are rotationally symmetric. Therefore, the horizontal-to-vertical ratio (aspect ratio) of the display area A0 of the liquid crystal panel 18G (18R, 18B) is made to coincide with the horizontal-to-vertical ratio (aspect ratio) of the display area A2 of the screen SC. Furthermore, when the second group 40 is retracted, the transmittance of the second group 40 increases compared with the case where it is in the optical path, and thus it is possible to increase the luminance of the image.

Here, in an apparatus such as the projector 2 (refer to FIG. 1) that performs image projection, tilt adjustment to move the system in up and down directions perpendicular to the optical axis OA of the projection optical system 20 is generally performed. For example, in the projection optical system 20 shown in FIGS. 3A to 3C, the fourth driving mechanism 64, which is a whole-system driving mechanism in the driving section 65, moves the entire main body part 20a in the direction perpendicular to the optical axis OA so as to adjust the amount of shift (the amount of deviation from the optical axis). Thereby, it is possible to increase or decrease the amount of deviation from the optical axis OA of the image projected on the screen SC. That is, by moving the optical axis OA of the main body part 20a from the center axis AX of the liquid crystal panel 18G by an appropriate amount of shift SF while keeping the optical axis OA of the main body part 20a parallel with the center axis AX of the liquid crystal panel 18G, it is possible to project an image at the position deviated from the optical axis OA, for example, in the upward direction (+Y direction). As a result, it is possible to move the projection position of the image up and down in the vertical direction through the adjustment of the amount of shift SF. Further, the amount of shift SF is fixed to, for example, a value other than zero, and may be adjusted by the fourth driving mechanism 64 which is the whole-system driving mechanism as necessary. As described above, the fourth driving mechanism 64 is a shift driving mechanism for performing the shift operation of the projection optical system 20 in the direction perpendicular to the optical axis OA. In the projection optical system 20, by achieving the state where the optical axis OA of the main body part 20a is moved by the appropriate amount of shift SF while being kept parallel with the center axis AX of the liquid crystal panel 18G, it is possible to perform projection using tilt. As a result, it becomes easy to prevent the image light PL from interfering with a viewer, and thus it becomes easy to install the projector.

However, in the case of the above-mentioned tilt projection, the center axis AX of the liquid crystal panel 18G is deviated from the optical axis OA of the projection optical system 20. Due to the positional relationship, the positions of the projected image are also deviated by the switch between the first operation state and the second operation state resulting from the advance or retreat of the second group 40. For example, as shown in FIGS. 5A to 5D, when the conversion of the aspect ratio for squeeze in the vertical direction causes the switch from the first operation state to the second operation state, the fixed point at the reference of the conversion, that is, around the time of the conversion is the point OX in the optical axis OA. Accordingly, when an image is projected in the second operation state shown in FIGS. 5A and 5B, the image is projected in a state where the center position CC of the display area A2 in the second operation state coincides with the center O of the screen SC. However, when the state is switched into the first operation state shown in FIGS. 5C and 5D, as indicated by the arrow in FIGS. 5B to 5D, the center position CC of the display area A2 is deviated downward, that is, toward the −Y side on which the point OX is present. In the embodiment, by performing the zoom operation or the shift operation so as to correct the change in the center position CC caused by the switch from the first operation state to the second operation state, it is possible to ensure the display area A2 in an appropriate range in the screen SC.

Figure 6B:
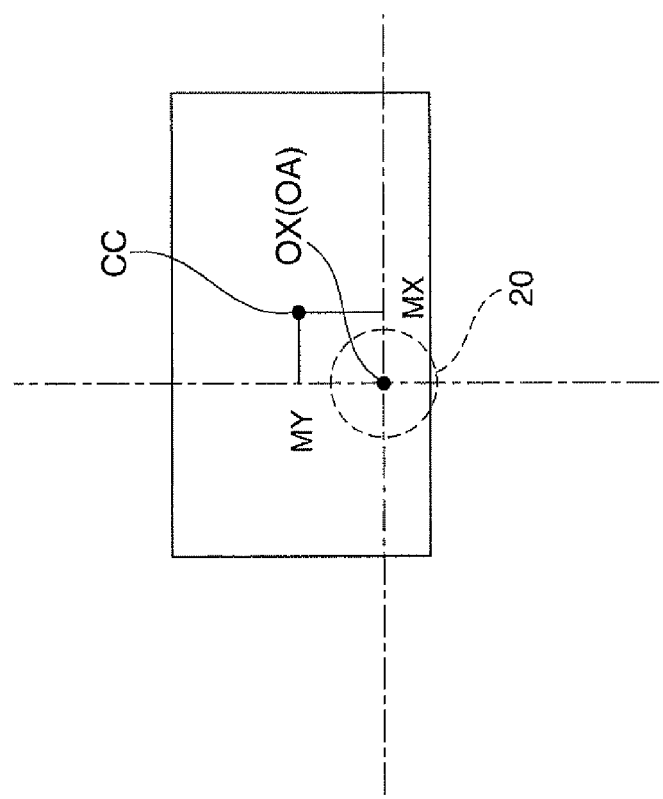
FIG. 6B is a diagram illustrating deviation on the screen side caused by the deviation shown in FIG. 6A.
Figure 6A:
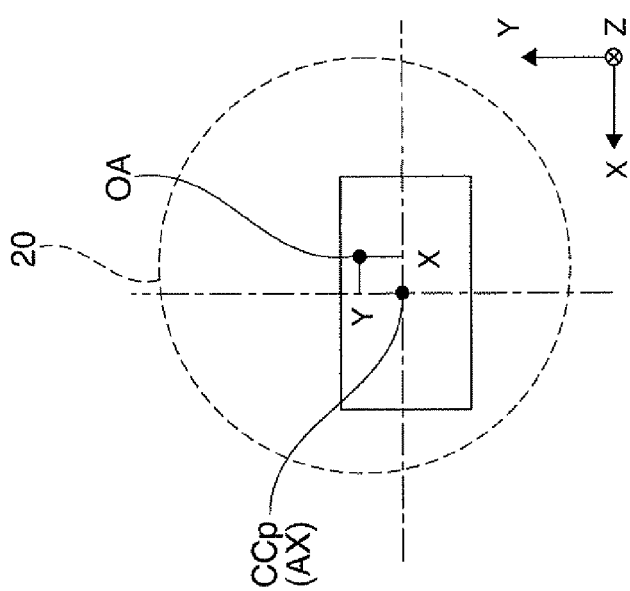
FIG. 6A is a diagram illustrating deviation between the center of a panel and the optical axis of the projection optical system in the tilt projection.

FIG. 6A is a diagram illustrating deviation between the center axis AX of the liquid crystal panel 18G and the optical axis OA of the projection optical system in the tilt projection. Here, it is assumed that the shift causes deviation in both the X direction as the first direction perpendicular to the optical axis OA and the Y direction as the second direction perpendicular to the optical axis OA and the first direction. In addition, it is assumed that, relative to the point CCp in the center axis AX as the center of the liquid crystal panel 18G, the amount of deviation in the X direction as the first direction is an amount of deviation X, and the amount of deviation in the Y direction as the second direction is an amount of deviation Y. In this case, as shown in FIG. 6B, assuming that the magnification percentage (projection magnification) of projection is M, the values of the amounts of deviation on the screen SC side caused by the amounts of deviation X and Y are respectively represented by MX and MY. That is, the values are amounts by which the center position CC is offset from the point OX which is the reference position of the optical axis OA on the screen SC. That is, as the values of MX and MY increase, the deviation of the center position CC caused by the aspect ratio conversion shown in FIGS. 5B and 5D increases.

Hereinafter, referring to FIGS. 7A to 7D, an overview of an operation to correct the shift of the center position CC mentioned above will be described. In addition, referring to FIGS. 8A to 8D, change in the center position CC, that is, change in the display area A2 will be described. Note that, FIGS. 8A to 8D correspond to FIGS. 7A to 7D.

Figure 7A:
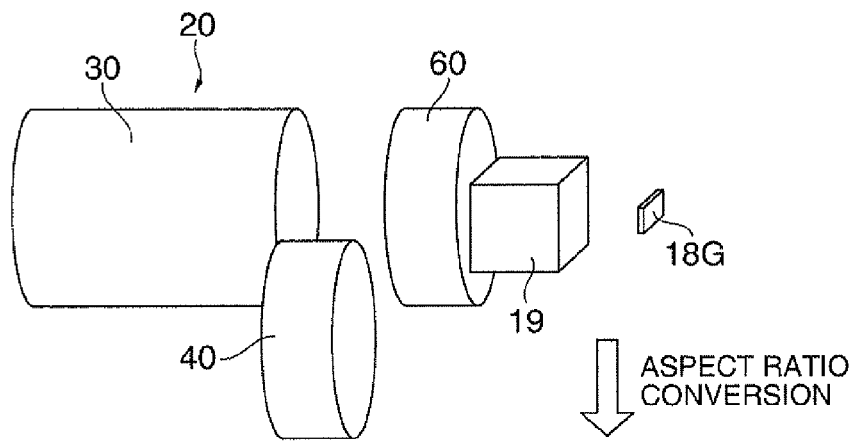
FIG. 7A is a diagram illustrating the projection optical system in the second operation state.
Figure 7B:
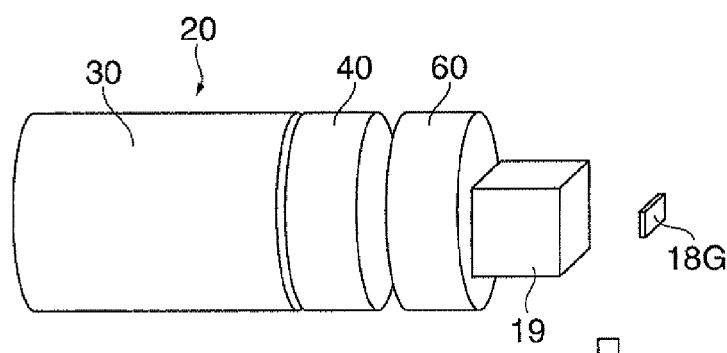
FIG. 7B is a diagram illustrating an operation of a switch from the second operation state to the first operation state.
Figure 7C:
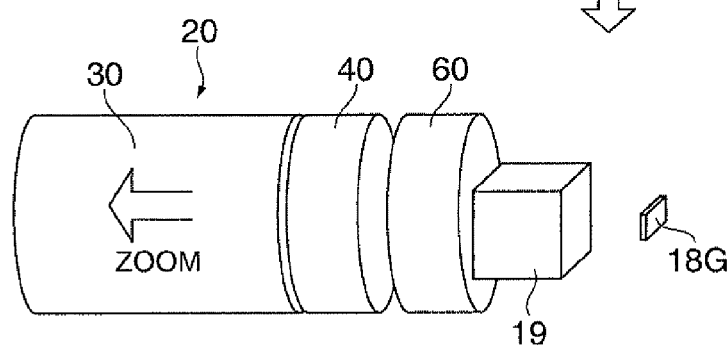
FIG. 7C is a diagram illustrating a zoom operation.
Figure 7D:
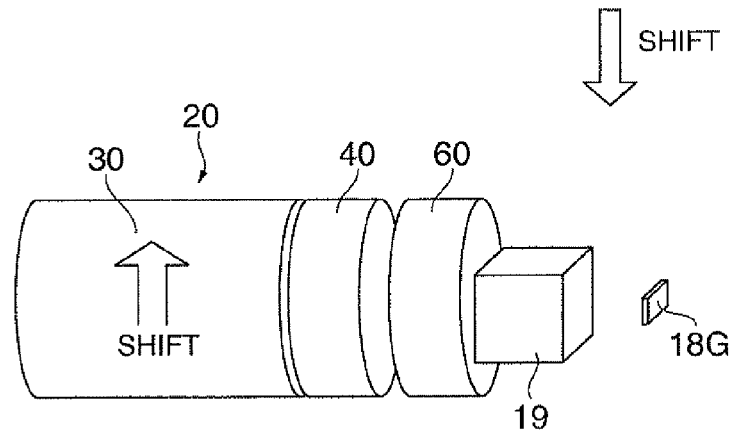
FIG. 7D is a diagram illustrating a shift operation.

By switching from the second operation state where the second group 40 is retracted as shown in FIG. 7A to the first operation state where the second group 40 is inserted as shown in FIG. 7B, the aspect ratio is converted. Next, as shown in FIG. 7C, in the first group 30, the first driving mechanism 61 described above in FIG. 3A and the like performs a zoom operation, that is, a zooming process. Finally, as shown in FIG. 7D, in the first group 30, the fourth driving mechanism 64 described above in FIG. 3A and the like performs a shift correction process. In such a manner, the center position CC and the display area A2 are corrected. Note that, in the above description, the zooming process may automatically enlarge or reduce an image by, for example, a predetermined projection magnification, or may manually enlarge or reduce an image by a desired projection magnification.

Figure 8A:
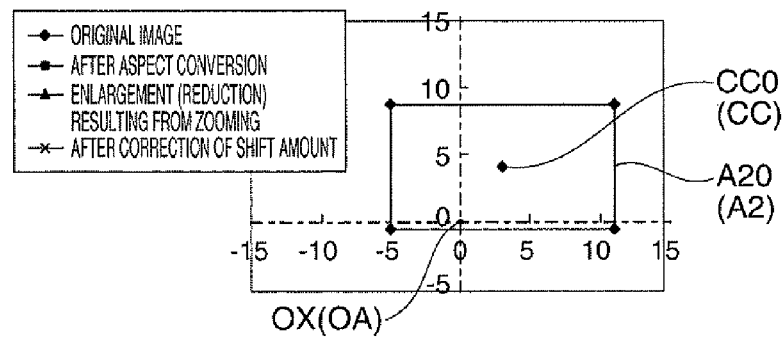
FIG. 8A is a diagram illustrating a projection area on the screen in the second operation state.
Figure 8B:
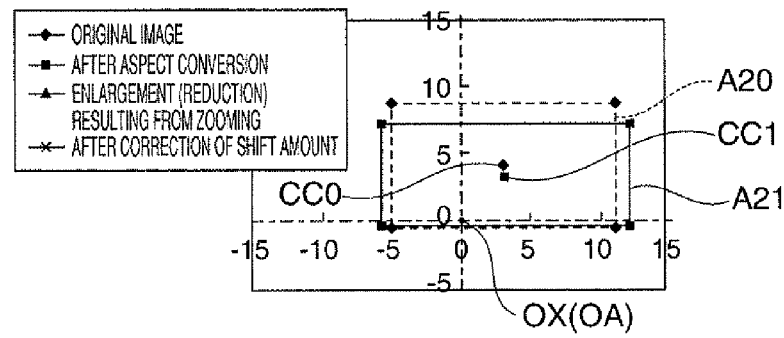
FIG. 8B is a diagram illustrating a change in the projection area on the screen caused by the switch from the second operation state to the first operation state.
Figure 8C:
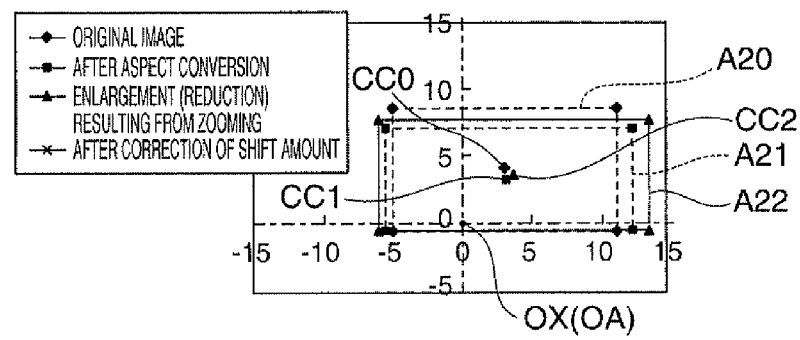
FIG. 8C is a diagram illustrating a change in the projection area on the screen caused by the zoom operation.
Figure 8D:
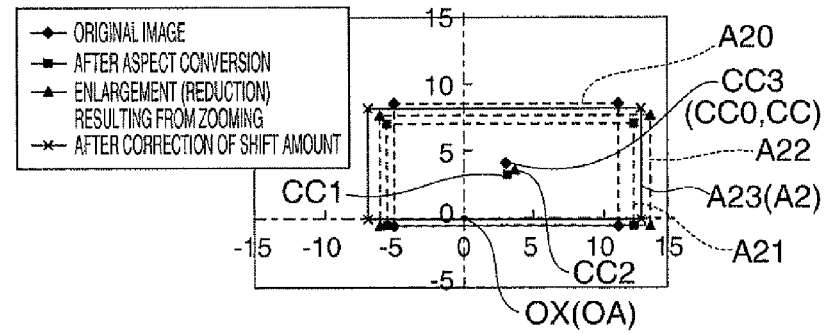
FIG. 8D is a diagram illustrating a change in the projection area on the screen caused by the shift operation.

Hereinafter, referring to FIGS. 8A to 8D, the correction of the center position CC and the display area A2 will be described in detail. In addition, the correction process described below is performed under the control of the main control section 88 (refer to FIG. 2). First, as shown in FIG. 8A, compared with the display area A20 and the center position CC0 thereof which are the display area A2 and the center position CC thereof in the second operation state before the aspect ratio conversion, as shown in FIG. 8B, the new display area A21 after the conversion into the first operation state is wider than the former display area A20 in the horizontal direction. Further, the new center position CC1 thereof is on the slightly lower right side of the former center position CC0. Next, as shown in FIG. 8C, by performing the zooming process, the new display area A22 after the process is enlarged or reduced to a desired size in a state where it has a shape similar to that of the former display area A21. Further, the new center position CC2 is slightly moved from the former center position CC1 by the effect of the enlargement or reduction process. Finally, as shown in FIG. 8D, by performing the shift correction process, the new display area A23 after the process still has the same shape as the former display area A22, while the new center position CC3 is returned to the initial center position CC.

Hereinafter, calculation of movement distance for performing the above-mentioned process will be described.

Hence, several numerical values are defined as follows. First, it is assumed that, in the second operation state where the second group 40 is retracted, the focal length of the projection optical system 20 in the first direction, that is, the X direction is $f_x$, and the focal length thereof in the second direction, that is, the Y direction is $f_y$. In contrast, it is assumed that, in the first operation state where the second group 40 is inserted, the focal length of the projection optical system 20 in the X direction is $f'_x$, and the focal length thereof in the Y direction is $f'_y$. Furthermore, the ratios of $f'_x$ to $f_x$ and $f'_y$ to $f_y$ are respectively represented by $T_x$ and $T_y$, and the ratios $T_x$ and $T_y$ are respectively given by the following formulae.

$$T_x = \frac{f'_x}{f_x}, T_y = \frac{f'_y}{f_y}$$

Further, around the time of conversion of the aspect ratio, the ratio of $f_y$ to $f_x$ and the ratio of $f'_y$ to $f'_x$ are respectively represented by A and A', and the ratios A and A' are given by the following formulae.

$$A = \frac{f_y}{f_x}, A' = \frac{f'_y}{f'_x}$$

In this case, an aspect conversion coefficient K represented by the ratio of A' to A is given by the following formula.

$$K = \frac{A'}{A} = \frac{f_x \cdot f'_y}{f'_x \cdot f_y} = \frac{T_y}{T_x}$$

Hereinafter, on the basis of the values of the focal lengths $f_x$ and $f_y$ and the like, a trace of the center position CC in FIGS. 8A to 8D will be described. First, similarly to FIG. 6B, in FIG. 8A, the amounts of deviation between the center positions CC of a screen image on the screen SC in the X and Y directions are MX and MY. Hence, the coordinates of the center position CC are (MX, MY) when the point OX as the reference is set as the origin. Next, as shown in FIG. 8B, at the time of switching from the second operation state to the first operation state, the rates of changes in focal lengths are the ratios $T_x$ and $T_y$, and thus the amounts of shift of the center position CC1 after the conversion are inverses thereof. Accordingly, the coordinates of the center position CC1 are (MX×1/$T_x$, MY×1/$T_y$). Subsequently, the coordinates of the center position CC2 after the zooming process shown in FIG. 8C are obtained by multiplying the coordinates of the center position CC1 by the projection magnification P determined by the zooming. Accordingly, the coordinates of the center position CC2 are (MX×P/$T_x$, MY×P/$T_y$). Finally, as shown in FIG. 8D, it is preferable that the center position CC3 after the shift correction coincides with the former center position CC. That is, it is preferable that the center position CC3 be shifted by the amounts of (MX, MY) on the projection optical system 20 side. Here, the coordinates of the center position CC2 in FIG. 8C are (MX×P/$T_x$, MY×P/$T_y$). That is, the center position CC2 is deviated by the amounts of P/$T_x$ and 2/$T_y$ times (MX, MY) which are the former coordinates respectively. Accordingly, the amounts of shift X' and Y' for correcting the deviation on the liquid crystal panel 18G side relative to the amounts of deviation X and Y are, by using such inverses, given by the following formulae.

$$X' = \frac{X \cdot T_x}{P} = \frac{X \cdot f'_x}{P \cdot f_x}, Y' = \frac{X \cdot T_y}{P} = \frac{X \cdot f'_y}{P \cdot f_y}$$

By performing adjustments to shift the center position on the projection optical system 20 side by the amounts of shift X' and Y', the center positions of the screen image on the screen SC before and after the aspect ratio conversion can be made to coincide with each other. That is, under the control of the main control section 88 (refer to FIG. 2), numerical values are appropriately read out from the table data of such numerical values which are provided in advance as necessary, or such numerical values are obtained by calculation, thereby performing various kinds of above-mentioned processes for adjusting the projection position of an image. Further, in FIGS. 7B to 7D and the like, after the second group 40 is inserted, the zooming process is performed, thereby performing the shift correction process after the zooming process. However, if the projection magnification P of the zooming and the amounts of shift X' and Y' calculated in accordance therewith are determined in advance, while inserting the second group 40, it is possible to integrally perform the zooming and the shift correction processes.

As described above, according to the projection optical system 20 of the embodiment, the second group 40 has different power in the vertical direction and the horizontal direction of the liquid crystal panel 18G (18R, 18B). Therefore, even the whole projection optical system 20 has different focal lengths in the vertical and horizontal directions and has different enlargement magnifications in the vertical and horizontal directions. The horizontal-to-vertical ratio of the image of the liquid crystal panel 18G (18R, 18B) and the horizontal-to-vertical ratio of the image projected on the screen SC can be set to be different. That is, the projection optical system 20 is able to convert the aspect ratio which is the ratio of width and height. At the time of converting the aspect ratio, that is, at the time of switching the projection state as described above, since the driving section 65 has either the fourth driving mechanism 64 as the shift driving mechanism or the first driving mechanism 61 as the zoom driving mechanism, it is possible to adjust the position of the image on the screen SC as the projection target surface through the shift operation or the zoom operation so as to reduce the deviation between the first operation state and the second operation state. That is, the projection optical system 20 is able to convert the aspect ratio, and is able to adjust the positional deviation of the projection image caused by the conversion of the aspect ratio.

FIGS. 9A and 9B are diagrams illustrating examples of the projection optical system which can be applied to the embodiment. FIG. 9A shows a cross-section of the projection optical system 20 in the horizontal direction (X direction). FIG. 9B shows a cross-section of the projection optical system 20 in the vertical direction (Y direction). As shown in FIG. 9B, in the projection optical system 20, the second group 40 includes, in order from the screen SC side, the first optical element group 41 with a positive power and the second optical element group 42 with a negative power, in the cross-section in the vertical direction (Y direction) as described above. Whereas, the first optical element group 41 and the second optical element group 42 are configured to have no power in the cross-section in the horizontal direction (X direction) shown in FIG. 9A. Accordingly, in the second group 40, the focal length in the horizontal direction (X direction) is set to be different from the focal length in the vertical direction (Y direction). As a result, even the whole projection optical system 20 including the first group 30 has different focal lengths $f_x$ and $f_y$ in the vertical direction and the horizontal direction. In this case, the second group 40 squeezes the image in the vertical direction (Y direction), and does not either squeeze or expand the image in the horizontal direction (X direction). That is, in the first operation state where the second group 40 is inserted, compared with the second operation state where it is retracted, the aspect conversion is made such that a horizontally-long projection image, which is squeezed in the vertical direction, is formed.

Further, according to another example of the projection optical system which can be applied to the embodiment, it may be possible to use an anamorphic optical system in which the second group 40 has a power different from that of the vertical direction (Y direction), in the cross-section in the horizontal direction (X direction). That is, it may be possible to adopt a configuration in which the first optical element group 41 in the second group 40 has a negative power, the second optical element group 42 has a positive power, and the image is expanded in the horizontal direction (X direction).

Furthermore, in the above description, the positional deviation is adjusted by both the fourth driving mechanism 64 as the shift driving mechanism and the first driving mechanism 61 as the zoom driving mechanism. However, in a specific case, it may be possible to adopt a configuration in which the positional deviation is adjusted by only either one thereof. For example, the second group 40 can be regarded as sort of a lens group having a zoom function with a specific magnification. Hence, when achieving the first operation state by inserting the second group 40, if the zooming is not necessary, it is possible to adjust the positional deviation by using only the fourth driving mechanism 64 as the shift driving mechanism. Note that, this corresponds to a case where the value of the projection magnification P determined by the zooming is P=1, and corresponds to a case where the display area A22 and the center position CC2 in FIG. 8C respectively coincide with the former display area A21 and the center position CC1. Further, after the second group 40 is inserted, the first driving mechanism 61 as the zoom driving mechanism performs zooming, and then if the shift correction is not necessary, it is possible to adjust the positional deviation by using only the first driving mechanism 61. This corresponds to a case where the display area A23 and center position CC3 in FIG. 8D respectively coincide with the former display area A22 and the center position CC2.

In addition, in the above description, the first group 30 and the third group 60 are lens groups which are fixed in the optical path all the time. However, these two groups can be regarded as an integrated lens group capable of cooperatively performing projection in the operation state. That is, the first group 30 and the third group 60, which are fixed in the optical path, are integrated as a single first group, and the second group 40, which is not fixed and is disposed to be able to advance and retract in the optical path, can be regarded as a second group.

Second Embodiment

Hereinafter, a projection optical system and the like according to a second embodiment will be described. Note that, the embodiment is modification examples of the projection optical system and the like of the first embodiment, the configurations of the projector 2 and the projection optical system 20 are the same as those of the first embodiment shown in FIGS. 2 and 3A and the like, and thus the drawings and description thereof will be omitted.

Figure 10A:
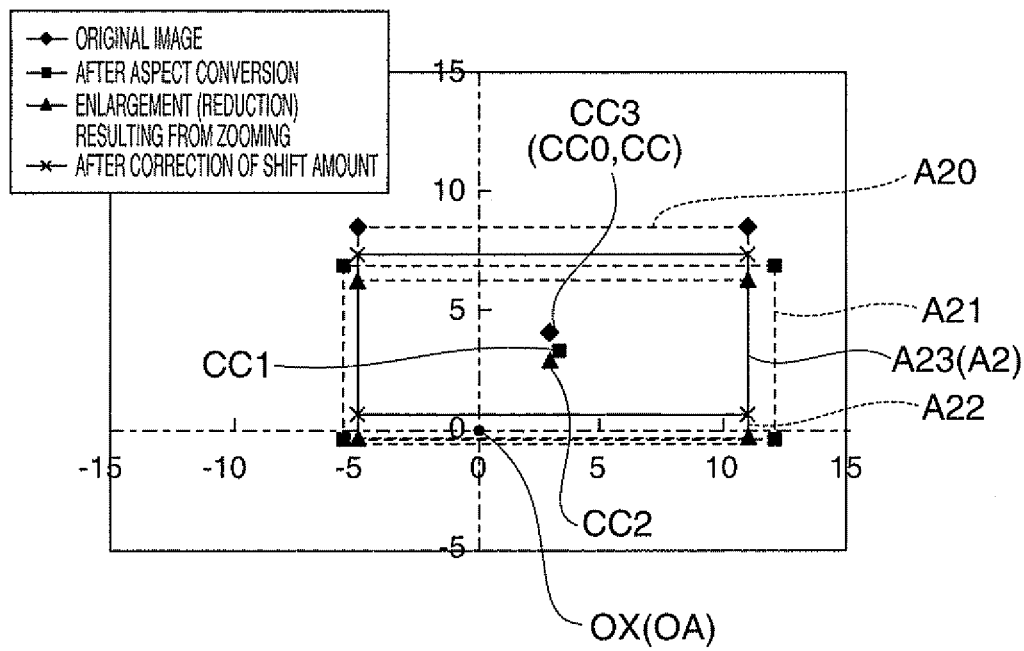
FIG. 10A is a diagram illustrating the switch from the second operation state to the first operation state of the projection optical system according to the second embodiment.

FIG. 10A is a diagram illustrating an example of correction of the amount of shift and the zoom operation performed by the aspect ratio conversion in the projection optical system according to the embodiment, and corresponds to FIG. 8D. That is, FIG. 10A shows adjustment of the position of the projection image performed by the aspect ratio conversion.

In particular, the example of FIG. 10A shows a case where the dimension in the horizontal direction, that is, the X direction is fixed on the screen SC. Specifically, first, the second operation state is switched into the first operation state, and thereafter enlargement or reduction in the zooming causes the horizontal width PX2, which is the width of the display area A22 in the X direction, to coincide with the horizontal width PX of the display area A2 in the second operation state. Subsequently, the shift correction operation causes the center position CC3 to coincide with the center position CC of the second operation state. The adjustment shown in FIG. 10A is advantageous, for example, when the screen SC with a fixed horizontal dimension is used. In this case, the main control section 88 functions as a dimension fixation control section that keeps the horizontal dimension constant.

Figure 10B:
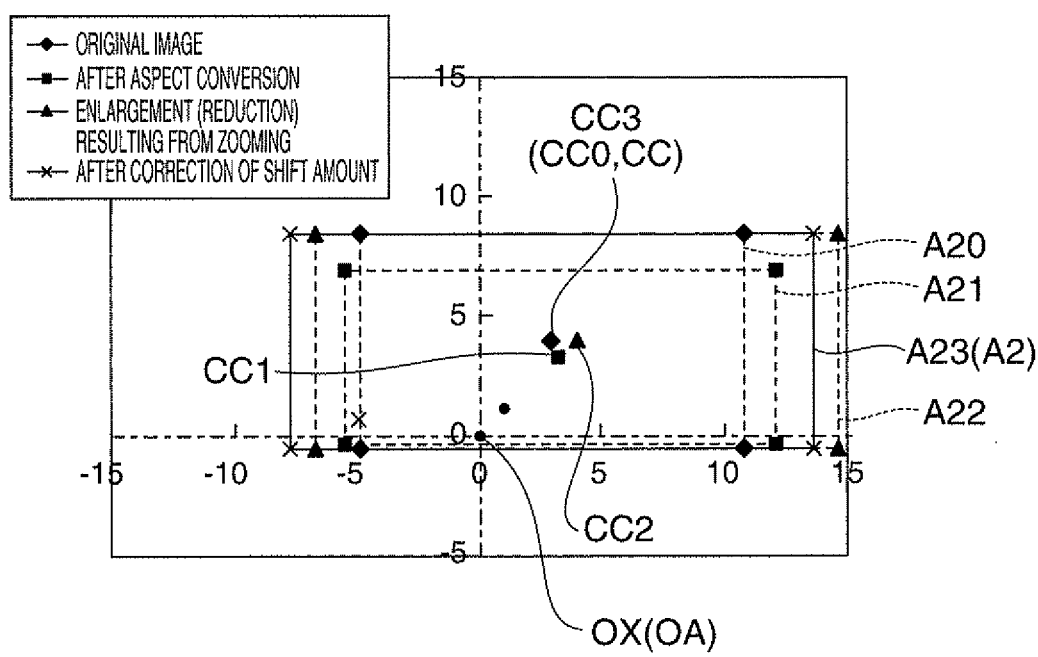
FIG. 10B is a diagram illustrating the switch from the second operation state to the first operation state of the projection optical system of a modification example.

Next, FIG. 10B is a diagram illustrating another example of correction of the amount of shift and the zoom operation performed by the aspect ratio conversion in the projection optical system, and corresponds to FIG. 8C.

In particular, the example of FIG. 10B shows a case where the dimension in the vertical direction, that is, the Y direction is fixed on the screen SC. That is, the adjustment is similar to that of FIG. 10A, but is different from that of FIG. 10A in that the adjustment is performed such that, during enlargement or reduction in the zooming, the vertical length PY2, which is the length of the display area A22 in the Y direction, coincides with the vertical length PY of the display area A2 in the second operation state. The adjustment shown in FIG. 10B is advantageous, for example, when the screen SC with a fixed vertical dimension is used. In this case, the main control section 88 functions as a dimension fixation control section that keeps the vertical dimension constant.

Figure 11:
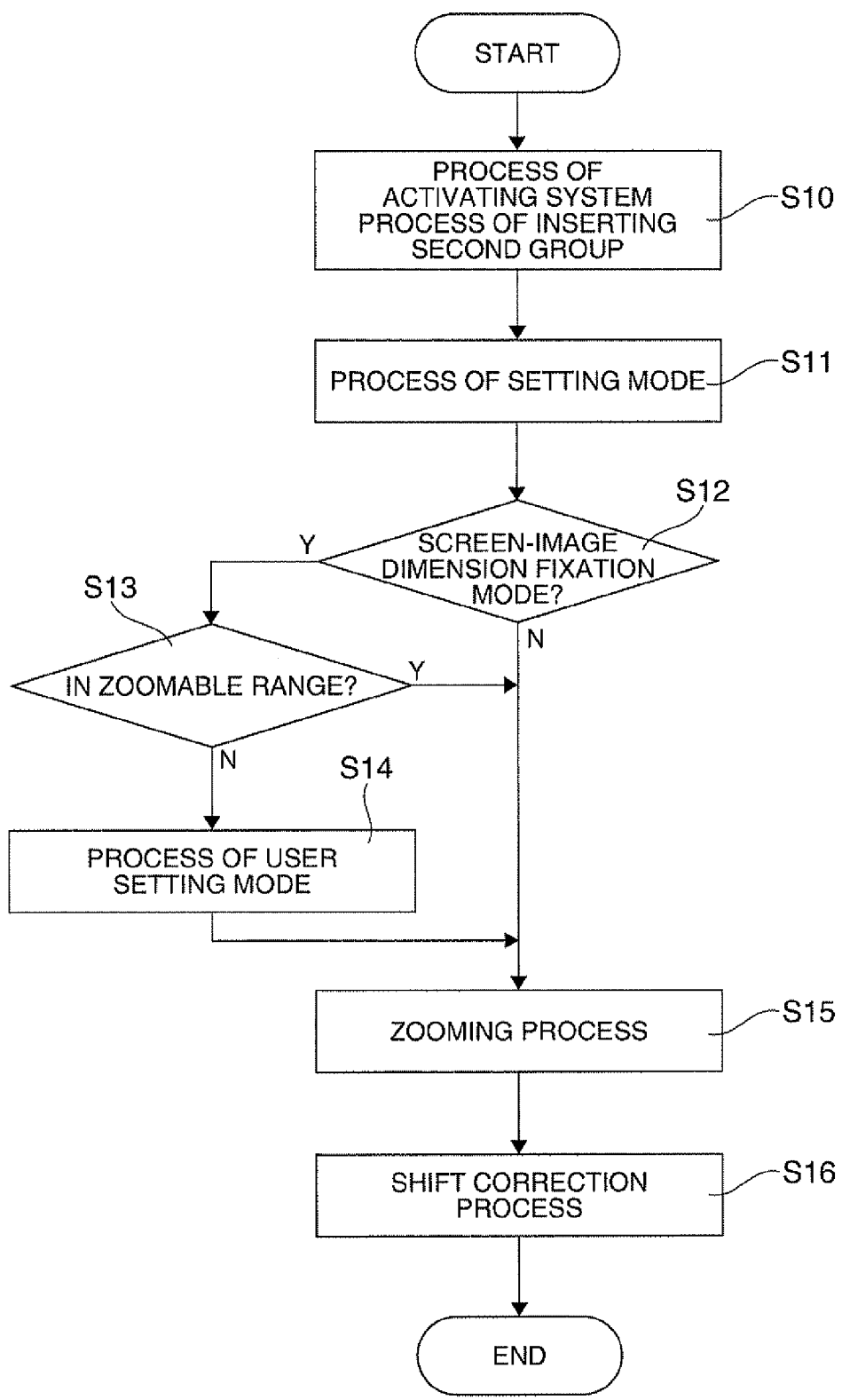
FIG. 11 is a flowchart illustrating the modification example in which a plurality of mode settings can be performed in the case of the switch from the second operation state to the first operation state.

FIG. 11 is a flowchart illustrating an example of the embodiment as another modification example, and an example in which the adjustment according to the modification example described with reference to FIGS. 10A and 10B is selectable. In this modification example, as processes for selecting the adjustment method, mode setting is provided (step S11). The control for the mode setting is performed under the control of the main control section 88 (refer to FIG. 2). Specifically, first, the main control section 88 activates the system of the projector 2, and the second operation state where the second group 40 in the projection optical system 20 is retracted is switched into the first operation state where the second group 40 is inserted in accordance with the instructions from a user (step S10). Then, in the mode setting process, an option of the user is accepted (step S11). In step S11, the size of the screen image after conversion, that is, the size of the display area is specified. That is, the ratio of enlargement or reduction resulting from the zooming is set. Hence, the user selects one of the following three options: the first option is a user setting mode in which a user manually sets the ratio of enlargement or reduction resulting from the zooming in an allowable range in the projection optical system 20 in a similar manner to the example of the embodiment; the second option is a horizontal dimension fixation mode in the case shown in FIG. 10A; and the third option is a vertical dimension fixation mode shown in FIG. 10B. In step S12, when the main control section 88 accepts one of the three options, it is determined which one of the first to third options is the selected option (step S12). In step S12, if it is determined that the option is the second or third option, that is, if it is determined that the option is the screen-image dimension fixation mode in which the horizontal or vertical dimension of a screen image is fixed (step S12=Yes), it is further determined whether or not the ratio is in a zoomable range in the projection optical system 20 (step S13). In step S13, if it is determined that the ratio is in the zoomable range (step S13=Yes), the zooming process is performed with the ratio of enlargement or reduction (step S15). In step S13, if it is determined that the ratio is not in the zoomable range, that is, if it is determined that it is difficult to perform the process of the selected second or third option (step S13=No), in order to perform the process in the user setting mode as the first option, the process of assisting a user to set the ratio in the zoomable range and accepting the setting again is performed (step S14). In step S14, when the ratio of enlargement or reduction is set in the zoomable range, the zooming process is performed with the ratio of enlargement or reduction (step S15). In contrast, in step S12, if it is determined that the option is the first option, that is, if it is determined that the option is the user setting mode in which the user manually sets the ratio in the zoomable range (step S12=No), the zooming process is performed with the ratio of enlargement or reduction (step S15). In such a manner, when the zooming process in step S15 is performed, the main control section 88 allows the projection optical system 20 to perform the shift correction process (step S16). With such a configuration, it is possible to adjust the display area and the center position of a screen image on the screen SC while converting the aspect ratio.

As described above, also in the embodiment, the projection optical system 20 is able to convert the aspect ratio, and is able to adjust the positional deviation of the projection image caused by the conversion of the aspect ratio.

Third Embodiment

Hereinafter, a projection optical system and the like according to a third embodiment will be described. Note that, the embodiment is modification examples of the projection optical system and the like of the first embodiment, and particularly omitted parts or items are the same as those of the first embodiment.

FIGS. 12A and 12B are diagrams illustrating structures of the projection optical system in the projector according to the embodiment, and correspond to FIGS. 4A and 4B of the first embodiment. The projection optical system 120 of the embodiment is practically formed of the first group 30 and the second group 40, and does not have the third group 60, contrary to the projection optical system 20 of the first embodiment. Here, the term "practically formed of" means that the projection optical system 120 includes not only the first group 30 and the second group 40 but also a lens which has no power in practice.

In the embodiment, the projection optical system 120 is also able to convert the aspect ratio, and is also able to adjust the positional deviation of the projection image caused by the conversion of the aspect ratio.

Others

Figure 13A:
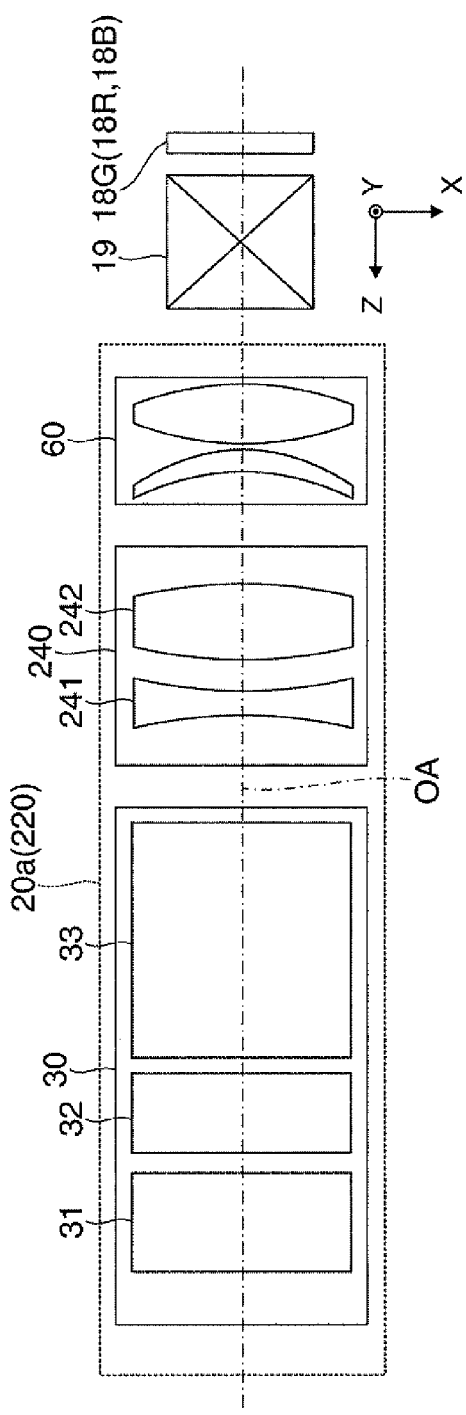
FIG. 13A is a diagram illustrating a configuration of a horizontal cross-section of an example of the projection optical system of the projector in the first operation state.
Figure 13B:
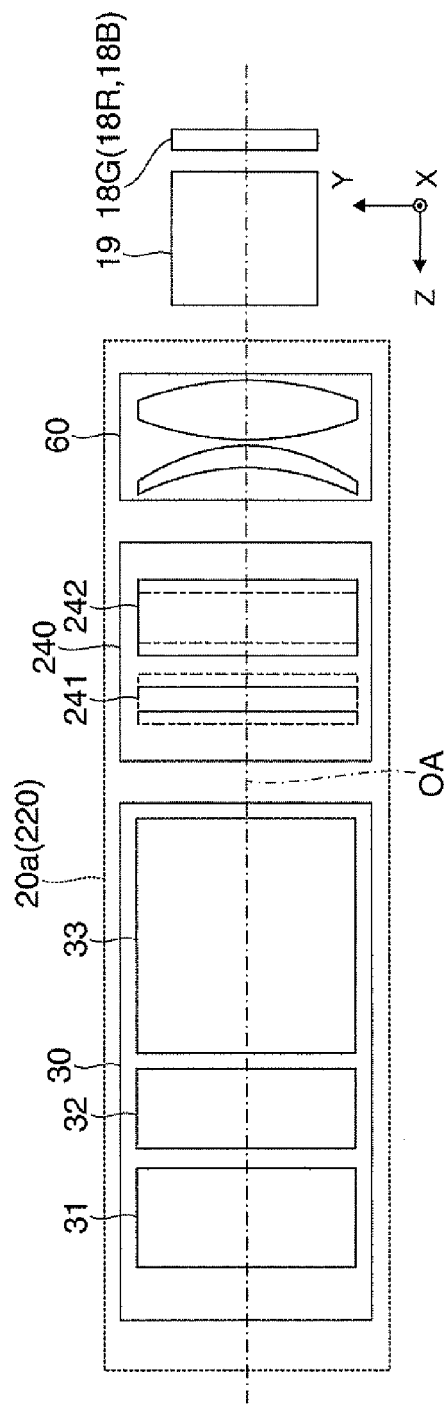
FIG. 13B is a diagram illustrating a configuration of a vertical cross-section of the projection optical system in the first operation state.

FIGS. 13A and 13B are diagrams illustrating a projection optical system 220 as another example. FIG. 13A shows a cross-section of the projection optical system 220 in the horizontal direction (X direction). FIG. 13B shows a cross-section of the projection optical system 220 in the vertical direction (Y direction). As shown in FIG. 13A, in the projection optical system 220, the second group 240 includes, in order from the screen SC side, a first optical element group 241 with a negative power and a second optical element group 242 with a positive power in a cross-section in the horizontal direction (X direction). Whereas, the first optical element group 241 and the second optical element group 242 are configured to have no power in the cross-section in the vertical direction (Y direction) shown in FIG. 13B. In this case, the second group 240 does not either squeeze or expand the image in the vertical direction (Y direction) and squeezes the image in the horizontal direction (X direction). That is, in the first operation state where the second group 240 is inserted, compared with the second operation state where it is retracted, the aspect conversion is made such that a horizontally-long projection image, which is expanded in the horizontal direction, is formed.

FIGS. 14A and 14B are diagrams illustrating a projection optical system 320 as another example. FIG. 14A shows a cross-section of the projection optical system 320 in the horizontal direction (X direction). FIG. 14B shows a cross-section of the projection optical system 320 in the vertical direction (Y direction). As shown in FIG. 14B, in the projection optical system 320, the second group 340 includes, in order from the screen SC side, the first optical element group 341 with a negative power and the second optical element group 342 with a positive power, in the cross-section in the vertical direction (Y direction). Whereas, the first optical element group 341 and the second optical element group 342 are configured to have no power in the cross-section in the horizontal direction (X direction) shown in FIG. 14A. In this case, the second group 340 expands the image in the vertical direction (Y direction), and does not either squeeze or expand the image in the horizontal direction (X direction). That is, in the first operation state where the second group 340 is inserted, compared with the second operation state where it is retracted, the aspect conversion is made such that a vertically-long projection image, which is expanded in the vertical direction, is formed.

Note that, although not shown in the drawing, by adjusting the power of the optical element groups constituting the second group 340, the aspect ratio may be converted such that the vertically-long projection image is formed by squeezing an image in the horizontal direction.

The invention is not limited to the embodiments mentioned above, and may be modified into various forms of the embodiment without departing from the technical scope of the invention.

It is not necessary for the second group 40 to be formed of only the optical element groups 41 and 42 which are rotationally asymmetric. Thus, an asymmetric optical element group may be added to the second group 40.

The liquid crystal panels 18R, 18G, and 18B are not limited to the transmissive types, but may be reflective types. Here, the "transmissive type" means that the liquid crystal panel is a type capable of transmitting modulated light. In addition, the "reflective type" means that the liquid crystal panel is a type capable of reflecting modulated light.

In the above-mentioned projector 2, images with respective colors formed by the plurality of the liquid crystal panels 18R, 18G, and 18B are synthesized. However, an image formed by a color or monochrome liquid crystal panel as a single light modulation element may be projected by the projection optical system 20 in an enlarged manner. In this case, the cross dichroic prism 19 is not necessary, and thus a degree of freedom in optical design of the projection optical system 20 increases.

As the projector, there are front-projection-type projectors that project an image from the side on which the projection surface is observed, and rear-projection-type projectors that project an image from the side opposite to the side on which the projection surface is observed. However, the configuration of the projector shown in FIG. 2 or the like can be applied to anything.

Instead of the liquid crystal panels 18R, 18G, and 18B, the digital micro mirror devices, in which the micro mirrors serves as pixels, or the like may be used as the light modulation elements.

Further, in the embodiment, it may be possible to add at least one lens, which has no power practically, around or between the lenses constituting the respective groups 30, 40, and 60 and the like.

The entire disclosure of Japanese Patent Application No. 2011-235728, filed Oct. 27, 2011 is expressly incorporated by reference herein.

What is claimed is:

1. A projection optical system in which a horizontal-to-vertical ratio of an image of a light modulation element is set to be different from a horizontal-to-vertical ratio of an image projected onto a projection target surface at the time of projecting the image onto the projection target surface in an enlarged manner; the projection optical system comprising:
   a first group that is disposed on an optical path;
   a second group that includes an anamorphic optical system which has different powers in a vertical direction and a horizontal direction of the light modulation element and is able to be inserted in and retracted from the optical path; and
   a driving section that has a second group insertion and retreat driving mechanism which inserts and retracts the second group, and at least one of (i) a shift driving mechanism which integrally shifts the first group and the second group in a direction perpendicular to an optical axis direction, and (ii) a zoom driving mechanism which drives the first group in the optical axis direction, so as to reduce deviation in a projection position caused by the insertion and retreat of the second group,
   wherein in a state where the second group is retracted from the optical path, when a center position of the light modulation element is shifted by a predetermined amount of deviation from an optical axis of the first group, assuming that the amounts of deviation from the center position of the light modulation element with respect to the optical axis of the first group in a first direction perpendicular to the optical axis of the first group and a second direction perpendicular to the optical axis of the first group and the first direction are respectively X and Y, focal lengths in the first direction and the second direction are $f_x$ and $f_y$, and
   in a state where the second group is inserted in the optical path, assuming that focal lengths in the first direction and the second direction are $f'_x$ and $f'_y$, a magnification of zoom performed by the zoom driving mechanism is P, and the amounts of shift performed by the shift driving mechanism are respectively X' and Y', the following expressions are established:

$$X' = \frac{X \cdot f'_x}{P \cdot f_x}, Y' = \frac{Y \cdot f'_y}{P \cdot f_y}.$$

2. The projection optical system according to claim 1, wherein the driving section has at least the shift driving mechanism, and integrally shifts the first group and the second group in accordance with the insertion and retreat of the second group.

3. A projector comprising:
the projection optical system according to claim 2; and
the light modulation element.

4. The projection optical system according to claim 1, wherein the driving section performs adjustments such that a center position of a projection image in the state where the second group is retracted from the optical path coincides with a center position of a projection image in the state where the second group is inserted in the optical path.

5. A projector comprising:
the projection optical system according to claim 4; and
the light modulation element.

6. The projection optical system according to claim 1, wherein the driving section has both the shift driving mechanism and the zoom driving mechanism, adjusts a magnification percentage of the image on the projection target surface through an operation of the zoom driving mechanism, and adjusts the position of the image on the projection target surface through an operation of the shift driving mechanism.

7. The projection optical system according to claim 6, further comprising a dimension fixation control section that keeps either one of the vertical direction and the horizontal direction of the image projected onto the projection target surface in the vertical direction and the horizontal direction around a time of conversion in the horizontal-to-vertical ratio of the image caused by the insertion or retreat operation of the second group.

8. A projector comprising:
the projection optical system according to claim 7; and
the light modulation element.

9. A projector comprising:
the projection optical system according to claim 6; and
the light modulation element.

10. The projection optical system according to claim 1, wherein the second group is formed of, in order from the projection target surface side, a first optical element group with a positive power and a second optical element group with a negative power, in a cross-section of the light modulation element in the vertical direction.

11. A projector comprising:
the projection optical system according to claim 10; and
the light modulation element.

12. The projection optical system according to claim 1, wherein the second group is formed of, in order from the projection target surface side, a first optical element group with a negative power and a second optical element group with a positive power, in a cross-section of the light modulation element in the horizontal direction.

13. A projector comprising:
the projection optical system according to claim 12; and
the light modulation element.

14. The projection optical system according to claim 1, wherein the first group is formed of lens groups which are rotationally symmetric.

15. A projector comprising:
the projection optical system according to claim 14; and
the light modulation element.

16. A projector comprising:
the projection optical system according to claim 1; and
the light modulation element.

17. The projection optical system according to claim 1, further comprising a third group that is disposed on the optical path,
wherein the shift driving mechanism integrally shifts the first group, the second group and third group in the direction perpendicular to the optical axis direction.

18. A projection optical system in which a horizontal-to-vertical ratio of an image of a light modulation element is set to be different from a horizontal-to-vertical ratio of an image projected onto a projection target surface at the time of projecting the image onto the projection target surface in an enlarged manner, the projection optical system comprising:
a first group that is disposed on an optical path;
a second group that includes an anamorphic optical system which has different powers in a vertical direction and a horizontal direction of the light modulation element and is able to be inserted in and retracted from the optical path; and
a driving section that has a second group insertion and retreat driving mechanism which inserts and retracts the second group, a shift driving mechanism which integrally shifts the first group and the second group in a direction perpendicular to an optical axis direction, and a zoom driving mechanism which drives the first group in the optical axis direction, so as to reduce deviation in a projection position caused by the insertion and retreat of the second group,
wherein when the second group is inserted in the optical path, the zoom driving mechanism drives the first group before the shift driving mechanism integrally shifts the first group and the second group,
in a state where the second group is retracted from the optical path, when a center position of the light modulation element is shifted by a predetermined amount of deviation from an optical axis of the first group, assuming that the amounts of deviation from the center position of the light modulation element with respect to the optical axis of the first group in a first direction perpendicular to the optical axis of the first group and a second direction perpendicular to the optical axis of the first group and the first direction are respectively X and Y, focal lengths in the first direction and the second direction are $f_x$ and $f_y$, and
in a state where the second group is inserted in the optical path, assuming that focal lengths in the first direction and the second direction are $f'_x$ and $f'_y$, a magnification of zoom performed by the zoom driving mechanism is P, and the amounts of shift performed by the shift driving mechanism are respectively X' and Y', the following expressions are established:

$$X' = \frac{X \cdot f'_x}{P \cdot f_x}, Y' = \frac{Y \cdot f'_y}{P \cdot f_y}.$$

* * * * *